(12) United States Patent
Chandrachood et al.

(10) Patent No.: US 10,997,538 B1
(45) Date of Patent: May 4, 2021

(54) RESOURCE MANAGEMENT

(71) Applicant: Amazon Technologies, Inc., Seattle, WA (US)

(72) Inventors: Santosh Chandrachood, Milpitas, CA (US); Gayatri Ramesh Deo, Mountain View, CA (US); Ankit Kamboj, Redmond, WA (US); Lukasz Misiuda, Redmond, WA (US); Amit Purohit, Issaquah, WA (US); Aravind Ramarathinam, Sammamish, WA (US); Ramkumar Kamalapuram Sugavanam, Bothell, WA (US); Vinayak Thapliyal, Seattle, WA (US); Linchi Zhang, Sunnyvale, CA (US); Min Zhou, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 505 days.

(21) Appl. No.: 15/820,156

(22) Filed: Nov. 21, 2017

(51) Int. Cl.
*G06F 15/173* (2006.01)
*G06Q 10/06* (2012.01)
*G06Q 30/02* (2012.01)
*G06F 16/25* (2019.01)

(52) U.S. Cl.
CPC ..... *G06Q 10/06312* (2013.01); *G06F 16/254* (2019.01); *G06Q 10/067* (2013.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 8,868,766 | B1* | 10/2014 | Theimer | G06F 9/5061 709/229 |
| 9,710,830 | B1* | 7/2017 | Vermeulen | G06Q 30/02 |
| 2005/0010608 | A1 | 1/2005 | Horikawa | |
| 2007/0124363 | A1 | 5/2007 | Lurie et al. | |
| 2011/0258320 | A1* | 10/2011 | Jackson | H04L 67/1008 709/226 |
| 2014/0089510 | A1 | 3/2014 | Hao et al. | |
| 2014/0180862 | A1* | 6/2014 | Certain | G06Q 30/08 705/26.3 |
| 2014/0189703 | A1* | 7/2014 | Gilder | G06F 9/5027 718/104 |
| 2015/0134795 | A1* | 5/2015 | Theimer | G06F 16/254 709/223 |

(Continued)

*Primary Examiner* — Phyllis A Book
(74) *Attorney, Agent, or Firm* — Davis Wright Tremaine LLP

(57) ABSTRACT

A system operated by a computing resource service provider maintains a pool of computing resources for use in processing job requests submitted by customers. The system allocates computing resources to the pool in anticipation of future resource needs. In various embodiments, future resource needs can be estimated based on scheduled jobs, or historical job information. In an embodiment, the computing resources are virtual computer systems which may be arranged in a cluster. In response to receiving a parallel processing job from a customer, the system reserves computing resources from the pool for performing the job. In an embodiment, the reserved resources are configured with a network namespace that is able to access to a customer's resources.

20 Claims, 16 Drawing Sheets

(56) References Cited

U.S. PATENT DOCUMENTS

| | | | |
|---|---|---|---|
| 2015/0381436 A1* | 12/2015 | Jackson | G06F 9/5027 709/225 |
| 2016/0323377 A1* | 11/2016 | Einkauf | H04L 67/1076 |
| 2017/0270450 A1* | 9/2017 | Binotto | H04L 41/046 |
| 2017/0295221 A1 | 10/2017 | Imamura et al. | |
| 2018/0027049 A1* | 1/2018 | Atlas | H04L 67/10 709/223 |
| 2018/0074855 A1* | 3/2018 | Kambatla | G06F 9/50 |
| 2018/0136980 A1* | 5/2018 | Shaffer | G06F 9/5061 |
| 2019/0058669 A1* | 2/2019 | Duarte | H04L 41/5009 |
| 2019/0068641 A1 | 2/2019 | Araujo et al. | |

* cited by examiner

RESOURCE MANAGEMENT

CROSS-REFERENCE TO RELATED APPLICATIONS

This application incorporates by reference for all purposes the full disclosure of co-pending U.S. patent application Ser. No. 15/820,089, filed concurrently herewith, entitled "CLUSTER MANAGEMENT".

BACKGROUND

Business customers are increasingly relying on third parties to provide computing resources via Web-based services. Rather than relying on a conventional business computing environment developed and deployed in-house, many businesses acquire computing resources from Web-based service providers. Web-based service providers provide access to computing resources in the form of dedicated or shared computer servers, virtual machines, or even serverless execution environments. Such solutions are convenient for the customer, since the customer does not need to acquire, maintain, and upgrade physical hardware. In addition, customers are more easily able to expand or scale back their computing needs in response to fluctuating demand. Therefore, for computing resource service providers, providing flexible and manageable computing environments that are properly configured to the shifting needs of customers is an important problem.

BRIEF DESCRIPTION OF THE DRAWINGS

Various techniques will be described with reference to the drawings, in which.

DETAILED DESCRIPTION

Figure 1:
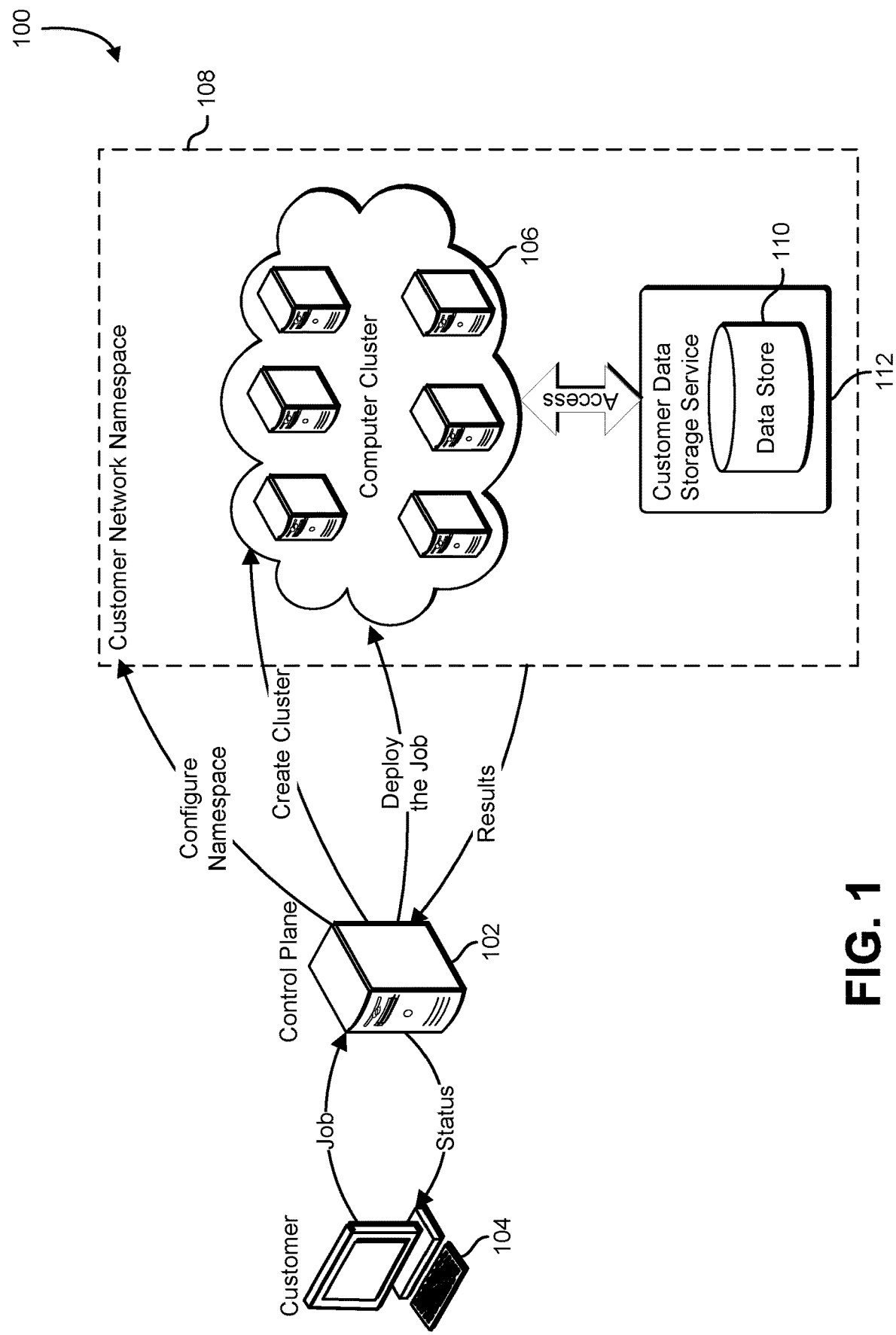
FIG. 1 shows a system in accordance with one embodiment.

The present document describes a system that performs jobs submitted by a customer using a cluster of computing resources configured and operated by a computing resource service provider. In an embodiment, the customer submits a job to a control plane computer system operated by the computing resource service provider. In an embodiment, the control plane computer system creates and configures a cluster of computing resources controlled by the computing resource service provider. In an embodiment, nodes of the cluster are monitored by the control plane. In an embodiment, the computing resources are virtual computer systems that are instantiated by the control plane computer system. In an embodiment, the cluster of computing resources includes a master node and one or more slave nodes. In an embodiment, each node in the cluster of computing resources is configured with a control plane network namespace and a data plane network namespace. In an embodiment, the control plane network namespace allows each node in the cluster of computing resources to access systems and computing resources under the control of the computing resource service provider. In an embodiment, the data plane network namespace is configured to access a customer network.

In an embodiment, the computing resource service provider allocates the nodes of the cluster on demand as a result of receiving a job. In an embodiment, individual nodes of the cluster are implemented as virtual computer systems, and a control plane computer system operated by the computing resource service provider instantiates an instance of a virtual computer system for each node of the cluster. In an embodiment, the control plane computer system generates a number of virtual computer system instances and a resource profile for each virtual computer system based on the characteristics of the received job. In an embodiment, the computing resource service provider may maintain the cluster for processing additional jobs having similar resource requirements. In an embodiment, when no additional compatible jobs are available, the computing resource service provider deallocates the resources associated with the cluster. In this way, customers that submit jobs to the computing resource service provider need not configure or manage a dedicated cluster of computer systems. Rather, computing resources may be allocated on the fly and maintained under the control of the computing resource service provider.

In an embodiment, individual jobs are performed by distributing tasks to individual nodes of the cluster. In an embodiment, a task is a set of operations that are performed by the nodes of the cluster to perform the job, such as a data-transformation operation that is part of an extraction transformation and loading ("ETL") job. In an embodiment, tasks may be specified by providing a set of computer-executable instructions, a script, a source code file, or an identifier associated with a set of computer-executable instructions. In an embodiment, the control plane computer system generates a gateway computer system node for hosting a task management client. In an embodiment, the gateway computer system node is specific to the requester that submitted the job, the security role, the data plane network namespace, and security group. In an embodiment, the tasks are launched on the individual nodes of the cluster by the gateway computer system node. In an embodiment, the tasks are run in the data plane network namespace on the individual nodes so that individual tasks are able to access resources on the customer network.

In an embodiment, the system provides customer credentials to the individual tasks to allow for authentication with customer resources. In an embodiment, when a job is submitted to the cluster by a customer, the cluster is assigned a security role of the customer. A security role includes a set of permissions that grant access to various actions and/or resources. In an embodiment, the security role may include permission to access a Web service, access to a data resource, or other network connected resource.

In an embodiment, the system provides a cluster of computer systems on which a distributed job may be executed. In an embodiment, operation of the cluster is managed by the control plane network namespace, while tasks are run in the data plane network namespace. In an embodiment, this allows individual tasks to access customer resources on the customer network by the data plane network namespace using credentials provided to the individual tasks. In an embodiment, the cluster of computer systems is created, managed, and deconstructed by the computing resource service provider on demand and in response to receiving the job from the customer, and the customer need only submit the job and collect the job results.

In an embodiment, a control plane computer system manages a pool of computing resources for processing job requests. In an embodiment, the pool of computing resources is a group of virtual computer system instances that may be allocated to the performance of incoming job requests. In an embodiment, the control plane computer system adjusts the amount of computing resources in the pool, based on a predicted resource demand. In an embodiment, the resource demand is estimated based on a collection of job requests in a job queue. In an embodiment, the control plane computer system analyzes the pending job requests in the job queue by determining an amount of resources for processing each job request and then adding computing resources to the pool to meet the estimated resource demand.

In an embodiment, individual job requests may be scheduled for fulfillment at a future time. In an embodiment, as of the time for fulfilling a job request approaches, the control plane computer system determines an amount of computing resources for fulfilling the upcoming job request, and adds corresponding additional computing resources to the pool. In an embodiment, the control plane computer system estimates future resource demands by examining historical records of past job performance. In an embodiment, the control plane computer system maintains a historical record of jobs performed and resources used to perform each job. In an embodiment, the control plane computer system identifies spikes in resource use that occur in a periodic basis such as an hourly, daily, weekly, monthly, or annual basis. In an embodiment, if the control plane computer system predicts an upcoming resource spike, a corresponding amount of computing resources is added to the resource pool in anticipation of the upcoming resource spike.

In an embodiment, as job requests are extracted from the job queue, resources are allocated from the resource pool to fulfill the job. In an embodiment, after the job completes, the control plane computer system examines the job queue to identify jobs with similar resource requirements and reuses the resources to perform the identified jobs. In an embodiment, after the job completes, the resources may be scrubbed of job-specific information and returned to the job queue. In an embodiment, after the job completes, the resources may be deallocated, and new virtual computer system instances created and added to the resource pool. In various embodiments, resources that are allocated from the resource pool may be arranged into clusters that have access to job-specific resources via a network namespace.

In this way, users that submit individual jobs need not create nor provide dedicated resources for performing each job. Rather, resource requirements may be expressly or implicitly provided with each job, and the control plane computer system allocates specific resources from a warm pool of available resources. In various embodiments, this results in a more efficient and flexible use of computing resources, and may also result in faster performance since virtual computer systems are merely allocated from the resource pool and are not created from scratch for each job.

FIG. 1 shows a system in accordance with one embodiment. A system diagram illustrates an embodiment of a distributed processing system 100. In an embodiment, the system includes a control plane computer system 102 that receives job requests from a customer computer system 104. In an embodiment, in response to receiving the job request, the control plane computer system 102 determines a set of parameters for a computer cluster 106 that is capable of processing the job. In an embodiment, if the control plane computer system 102 determines that an existing computer cluster is capable of processing the job, the existing computer cluster is allocated to process the job. In an embodiment, if the control plane computer system 102 determines that there is not an existing computer cluster for processing the job, a new computer cluster is allocated by the control plane computer system 102. In an embodiment, a new computer cluster is allocated by instantiating a number of virtual computer systems, and configuring the virtual computer systems into a computer cluster in accordance with the parameters.

In an embodiment, the control plane computer system 102 configures the computer cluster 106 so that each computer system in the computer cluster 106 has access to a network namespace 108. In an embodiment, the network namespace is established when the computer cluster 106 is created by the control plane computer system 102. In an embodiment, when each computer system in the computer cluster 106 is created, the control plane computer system 102 causes an additional network stack to be generated on one or more computer systems of the computer cluster 106. In an embodiment, the additional network stack has a routing table different than the default network stack on each computer system. In an embodiment, the presence of two network stacks having two separate routing tables allows each computer system in the computer cluster 106 to access the control plane computer system 102 with the default network stack, and a data store 110 on a customer data storage service 112 with the additional network stack.

In an embodiment, a job is submitted to the control plane computer system 102 by the customer computer system 104. In an embodiment, the control plane computer system 102 determines the parameters of the job. In an embodiment, the parameters of the job include one or more of a security role that is used to access resources used by the job, a number of cluster computer systems used when processing the job, the customer network containing resources that are used by the job, and a customer account. In an embodiment, if there is an existing cluster that satisfies the parameters of the job, the existing cluster may be used to process the job. In an embodiment, if there is not an existing cluster that satisfies the parameters job, the control plane computer system 102 creates the computer cluster 106. In an embodiment, the computer cluster 106 may be created by allocating a number of physical computer systems or by instantiating a set of virtual computer systems. In an embodiment, the control plane computer system 102 configures each computer system in the computer cluster 106 with the network namespace 108 which allows each computer system to access the customer data storage service 112.

In an embodiment, the control plane computer system 102 uses the credentials provided with the job to acquire a security token authorizing access to the customer data storage service 112. In an embodiment, the security token is valid for a limited time, after which the security token expires and can no longer be used access the customer data storage service 112. In an embodiment, the control plane computer system 102 relays the security token to each computer in the computer cluster 106 where it is stored in memory that is accessible to a process that has access to the network namespace 108. In an embodiment, the control plane computer system 102 instantiates a set of tasks on the computer cluster 106 such that each task runs on an individual computer system in the computer cluster 106. In an embodiment, the set of tasks run in a process memory space that has access to the network namespace 108. In an embodiment, each task in the set of tasks is provided with the security token and may use the security token to access the customer data storage service 112. In an embodiment, each task provides results to the control plane computer system 102, and the results are synthesized into a job status which is provided to the customer computer system 104 after completion of the job.

In an embodiment, the control plane computer system 102 may disband the computer cluster 106 upon completion of the job. In an embodiment, the control plane computer system 102 disbands the computer cluster 106 by deleting the instances of the virtual computer systems that comprise the cluster. In an embodiment, the control plane computer system 102 waits for an amount of time after the job is completed before disbanding the computer cluster 106. In an embodiment, if another job is submitted to the control plane computer system 102 that matches the parameters of the existing computer cluster 106, the existing computer cluster 106 may be reused for processing the new job. In an embodiment, if an additional compatible job is not submitted within the amount of time, the control plane computer system 102 disbands the computer cluster 106.

Figure 2:
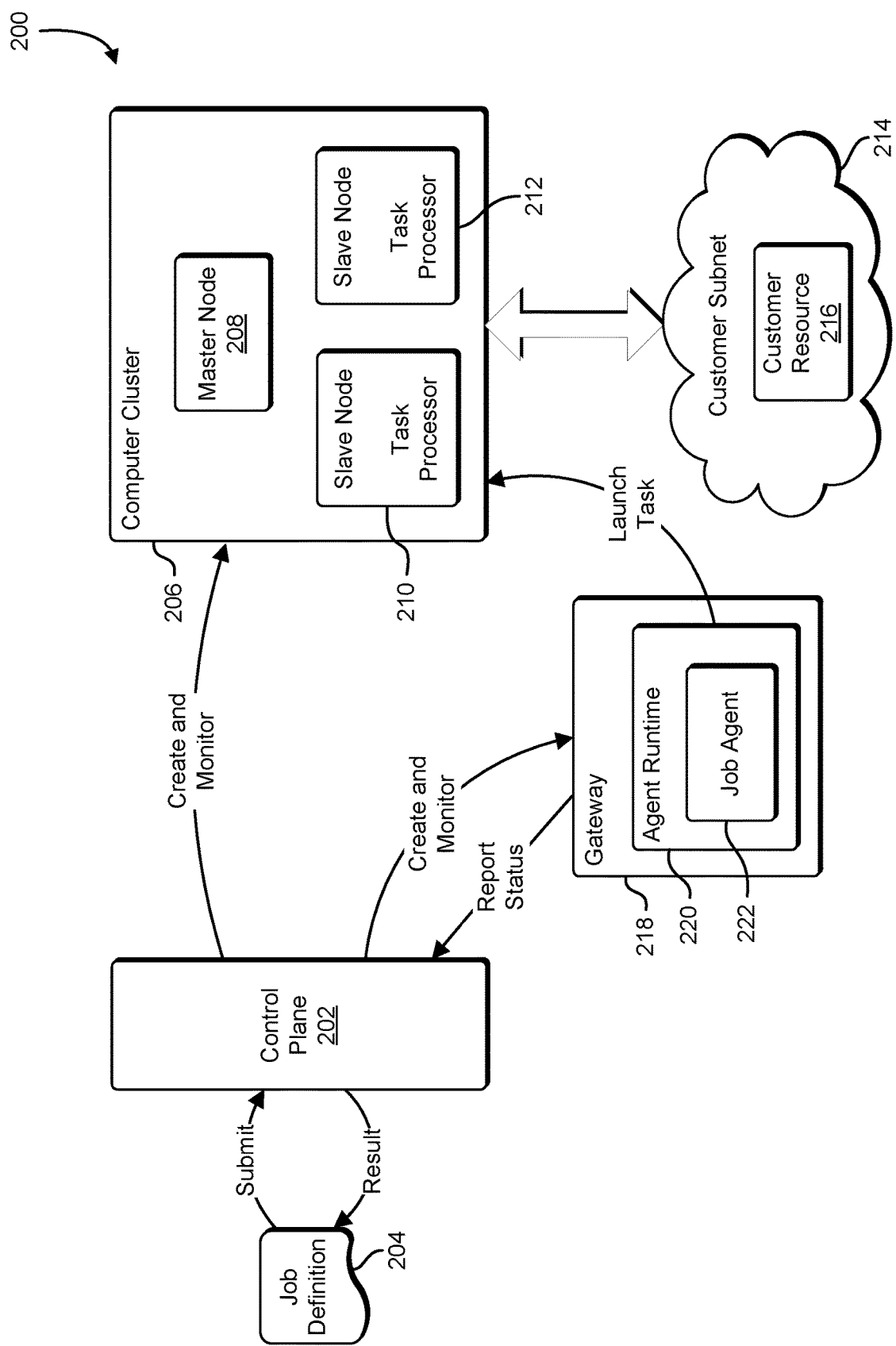
FIG. 2 shows an illustrative example of a distributed processing system, in accordance with one embodiment.

FIG. 2 shows an illustrative example of a distributed processing system, in accordance with one embodiment. A system diagram illustrates an embodiment of a parallel-processing system 200 for processing a job. In an embodiment, a control plane 202 receives a job definition 204 from a customer via a client computer system. In an embodiment, the job definition 204 may include source code, script files, executable instructions, intermediate code, or other information that identifies or describes the job that is to be performed by the system. In an embodiment, the control plane 202 is a computer system that communicates with the client computer system or a computer network. In an embodiment, the control plane 202 includes a cluster control plane that creates a computer cluster 206 for processing the job. In an embodiment, the cluster control plane creates the computer cluster 206 in accordance with a set of cluster parameters that are determined based at least in part on the characteristics of the job definition 204. In an embodiment, the cluster parameters may include a number of computer systems to be generated in the computer cluster 206 and memory, processor, and other resource requirements associated with each computer system in the computer cluster 206. In an embodiment, the cluster control plane generates a master node 208 and one or more slave nodes 210 and 212. In an embodiment, the cluster control plane configures each node of the computer cluster 206, and each node is able to access a first network namespace and a second network namespace. In an embodiment the first network namespace allows the computer cluster 206 to access the control plane 202, and the second network namespace allows the computer cluster 206 to access a customer subnet 214.

In an embodiment, the control plane 202 includes a glue control plane computer system. In an embodiment, the control plane 202 to relays information between namespaces on each node of the computer cluster 206. In an embodiment, the control plane 202 sends authentication information such as security tokens to individual nodes of the computer cluster 206 via the first network namespace, and the authentication information is relayed from the first network namespace to the second namespace by an agent on each node of the computer cluster 206. In an embodiment, this allows tasks running on the individual nodes of the computer cluster 206 to acquire the authentication information, and use the authentication information to access a customer resource 216 on the customer subnet 214.

In an embodiment, the system includes a gateway computer system 218. In an embodiment, the gateway computer system 218 supports an agent runtime 220 that hosts a job agent 222. In an embodiment, when a job arrives at the control plane 202 for execution, the control plane 202 generates the gateway computer system 218 if a compatible gateway is not already available. In an embodiment, the control plane 202 runs the job agent 222 which corresponds to the received job definition 204. In an embodiment, the agent runtime 220 supports the operation of the job agent 222. In an embodiment, the agent runtime 220 may be a Docker runtime, a script engine, an application framework, an interpreter, or a language runtime. In an embodiment, the job agent 222 runs directly on the gateway computer system 218 and the agent runtime 220 is omitted. In an embodiment, the job agent 222 launches individual tasks on individual slave nodes 210 and 212 of the computer cluster 206. In an embodiment, the job agent 222 monitors the status of each task dispatched to the computer cluster 206 and acquires task status information which is used to generate a job status. In an embodiment, the job status is reported by the gateway computer system 218 to the control plane 202, and the job status is relayed to the customer by the client computer system.

In an embodiment, the cluster control plane in the control plane 202 monitors the operation of the computer cluster 206 as tasks associated with the job definition 204 are run on the individual slave nodes. In an embodiment, the job agent 222 monitors the execution of the job by polling an agent on the master node 208 of the computer cluster 206. In an embodiment, the job agent monitors the execution of the job by monitoring the execution of individual tasks on the slave nodes 210 and 212 of the computer cluster 206.

Figure 3:
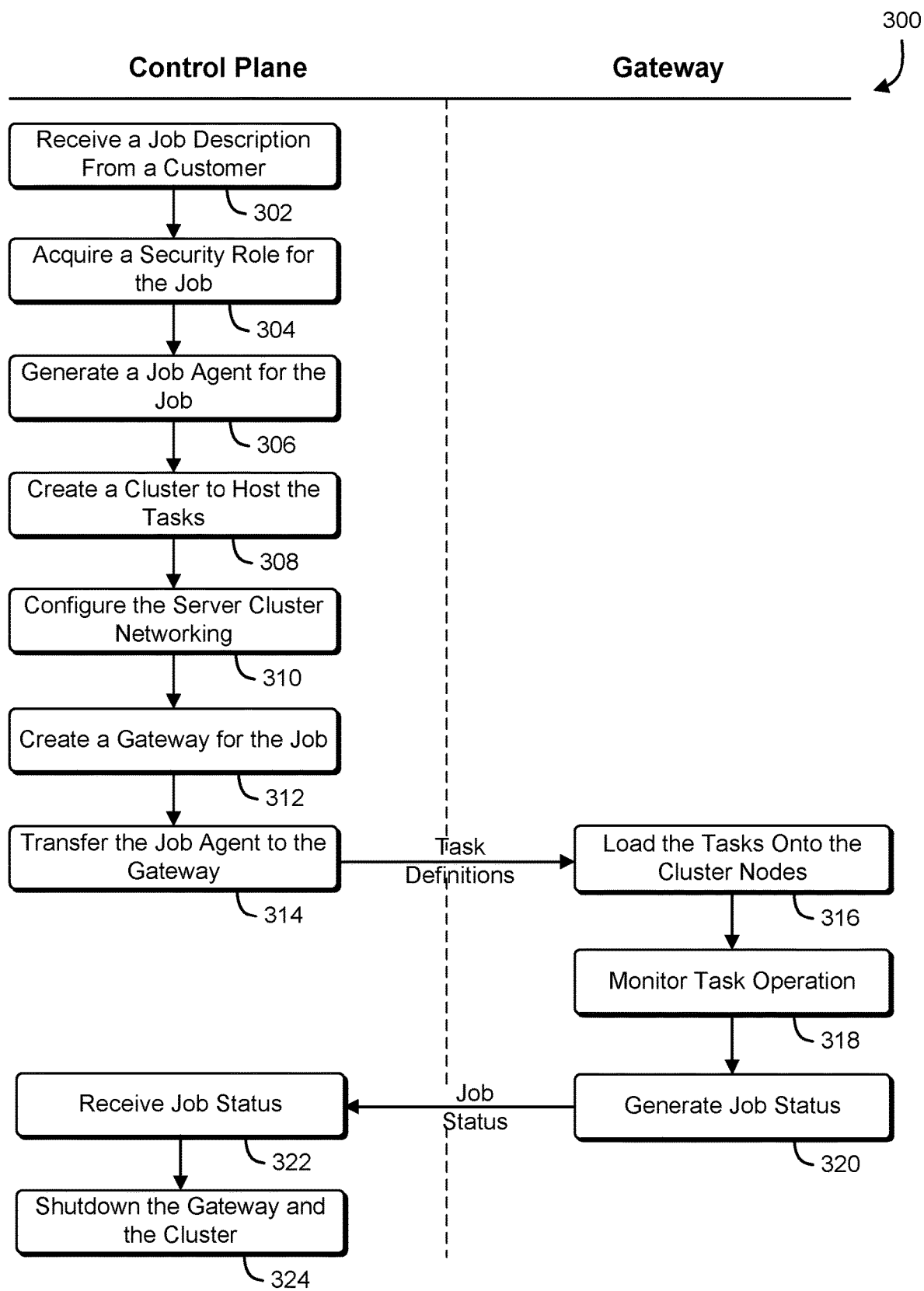
FIG. 3 shows an illustrative example of a process, in accordance with one embodiment.

FIG. 3 shows an illustrative example of a process, in accordance with one embodiment. A flowchart illustrates a process 300 that, if executed by a control plane computer system and a gateway computer system, executes a parallel processing job, in an embodiment. In an embodiment, the process begins at block 302 with the control plane computer system receiving a job description from a customer. In an embodiment, the job description is a mapreduce job or parallel processing job. In an embodiment, the control plane examines the job to identify a set of job characteristics. In an embodiment, the control plane acquires 304 a security role of the customer so that a cluster created by the control plane will be able to access customer resources on a customer network. In an embodiment, the control plane acquires a security token using the security role. In an embodiment, the security token is a cryptographically signed token containing an expiration date. In an embodiment, the security token containing the expiration date is not accepted as valid after the expiration date. In an embodiment, at block 306, the control plane computer system generates a job agent for the job based on the job description received from the customer. In an embodiment, the job agent is the job description itself. In an embodiment, the job agent is a modified version of the job description. In an embodiment, the job agent is a script or set of executable instructions corresponding to the job description.

In an embodiment, at block 308, the control plane computer system creates a cluster on which the job can be executed. In an embodiment, the control plane computer system generates the cluster in accordance with a set of cluster parameters that are determined based on a job description supplied by the customer. In an embodiment, the cluster is created by allocating a set of virtual computer system instances from a pool of computing resources, and configuring the set of virtual computer system instances with a master node and one or more slave nodes. In an embodiment, the master node coordinates the execution of tasks on the slave nodes, where the tasks work in coordination to perform a job. In an embodiment, the cluster parameters include a number of computer systems in the cluster. In an embodiment, the control plane computer system creates the cluster by configuring a set of existing hardware servers, and allocating the existing hardware servers to execute the job. In an embodiment, the control plane computer system creates the cluster by instantiating a set of virtual servers and configuring the virtual servers as a cluster in accordance with the cluster parameters. In an embodiment, the control plane computer system communicates with the cluster over a first network namespace, and configures 310 each computer system in the cluster so that each computer system in the cluster has access to a second network namespace not accessible to the control plane computer system. In an embodiment, the second network namespace allows each server in the cluster to access a customer network containing one or more customer resources. In an embodiment, customer sources may include storage systems, online services, Web-based services, cryptographic services, or other resources that are not accessible via the first network namespace. In an embodiment, a Web-based service is a service having an interface that is accessible via the Internet, an intranet, or other network using a hypertext transfer protocol ("HTTP") command such as a GET or PUT command. In an embodiment, Web-based services may include services that provide return data in XML or JSON formats. In various examples, Web-based services may include services based on representational state transfer ("REST"), Simple Object Access Protocol ("SOAP"), or Web Services Description Language ("WSDL").

In an embodiment, at block 312, the control plane computer system generates a gateway computer system for the job. In an embodiment, the cluster is configured with the master node and one or more slave nodes, and the gateway computer system is configured with access to the master node via the second network namespace. In an embodiment, the gateway computer system supports a runtime environment that is capable of running the job agent. In an embodiment, the job agent is transferred 314 from the control plane computer system to the gateway computer system.

In an embodiment, at block 316, the gateway computer system receives and executes the job agent. In an embodiment, the job agent loads individual tasks of the job on each slave node of the cluster. In an embodiment, individual tasks run on the individual slave nodes of the cluster, and are monitored 318 by the job agent. In an embodiment, the individual tasks return status information to the gateway computer system from corresponding job agents. In an embodiment, at block 320, the gateway computer system combines the status information returned from the individual tasks to produce a job status, and returns the job status to the control plane computer system.

In an embodiment, at block 322, the control plane computer system receives the job status from the gateway computer system. In an embodiment, the job status is relayed from the control plane computer system to the customer via a client computer system. In an embodiment, prior to suspending the cluster and freeing the associated resources, the control plane computer system waits for an amount of time to see if an additional job compatible with the current cluster is received. In an embodiment, if the compatible job is not received within the amount of time, the cluster is disbanded and the resources are freed. In an embodiment, the amount of time may be determined based at least in part on the amount of time and resources required to re-create a cluster similar to the existing one. In an embodiment, at block 324, the control plane computer system disbands the cluster and frees the associated resources upon completion of the job. In an embodiment, the control plane computer system waits until the cluster has been disbanded and the associated resources freed.

Figure 4:
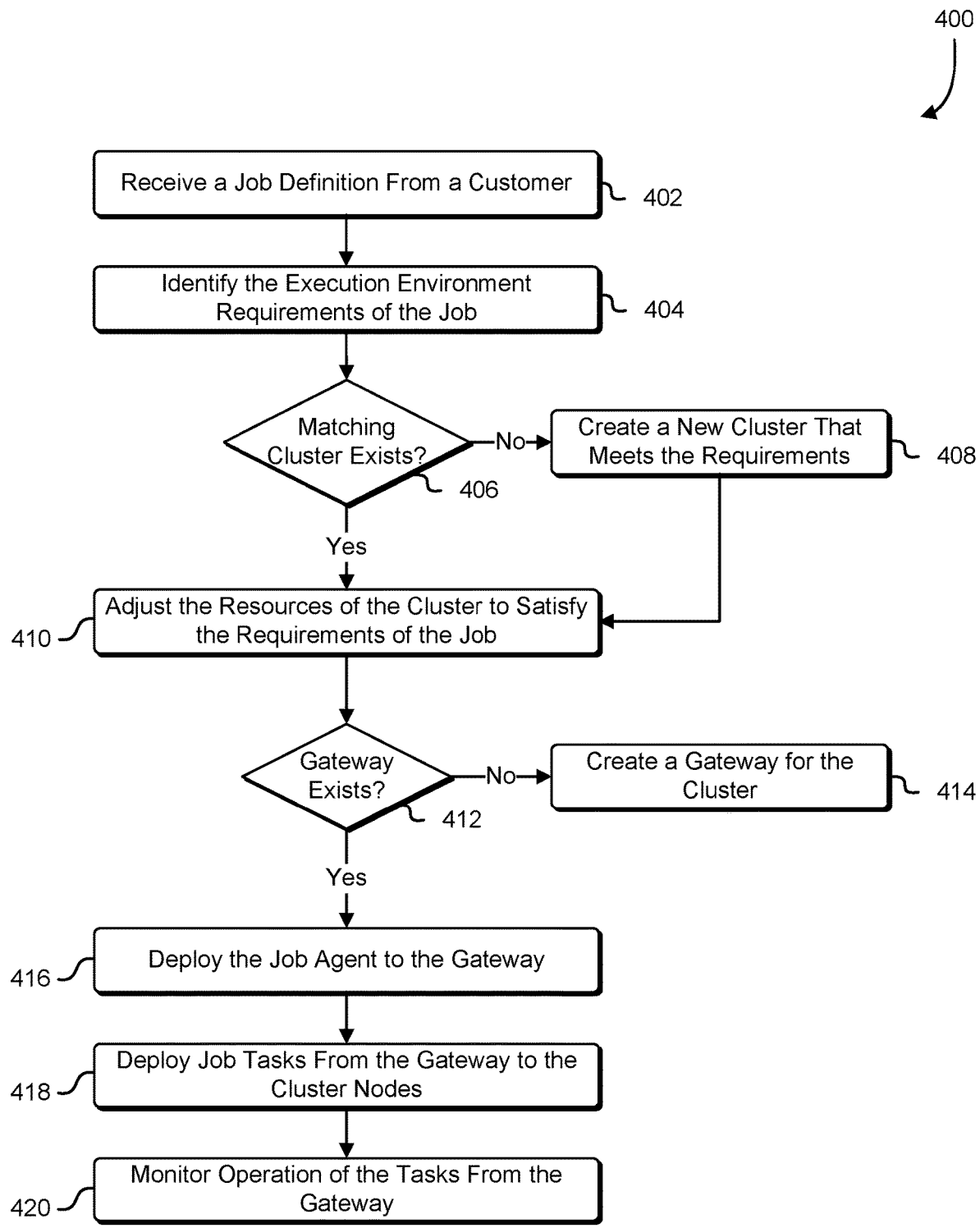
FIG. 4 shows an illustrative example of a process, in accordance with one embodiment.

FIG. 4 shows an illustrative example of a process, in accordance with one embodiment. A flowchart illustrates a process 400 that, if performed by a control plane computer system, acquires a computer cluster that is properly configured for a job, in an embodiment. In an embodiment, the process begins at block 402 with the control plane computer system receiving a job definition from a customer. In an embodiment, the job definition is a mapreduce or Hadoop Yarn job received from a client computer system operated under the control of the customer. In an embodiment, at block 404, the control plane computer system identifies the set of requirements for an execution environment capable of executing the job. In an embodiment, the requirements include a number of nodes in a computer cluster, an amount of memory for each node in the computer cluster, an amount of processing capability for each node of the computing cluster, and security credentials needed by each node of the computing cluster. In an embodiment, at decision block 406, the control plane computer system determines whether an existing cluster matches the identified set of requirements for executing the current job. If an existing cluster matches the identified set of requirements, the existing cluster is appropriated for use in executing the job and execution advances to block 410. If no existing cluster matches the identified set of requirements, execution advances to block 408 where the control plane computer system creates a new cluster that meets the identified set of requirements. In an embodiment, at block 408, after creating a new cluster that meets the identified set of requirements, execution advances to block 410.

In an embodiment, at block 410, the control plane computer system adjusts the resources of the cluster to satisfy the requirements of the job. In an embodiment, if a previously used cluster has more nodes than are required, access nodes of the reused cluster are freed and made available for other purposes. In an embodiment, if the node count of an unallocated cluster is insufficient to process the job, additional loads may be added to the cluster. In an embodiment, at decision block 412, the control plane computer system determines whether a gateway computer system for the cluster exists and satisfies the requirements of the job. In an embodiment, the gateway computer system satisfies the requirements of the job if the gateway computer system is connected to a namespace that allows interaction with tasks hosted on the individual nodes of the cluster which interact with customer resources. In an embodiment, if a suitable gateway does not exist, execution advances to block 414 and the control plane computer system generates a new gateway for the cluster. In an embodiment, the new gateway is configured with access to a customer subnet that allows communication with tasks distributed to individual nodes of the cluster. In an embodiment, after creating a new gateway, execution advances to block 416. In an embodiment, if a suitable gateway already exists at decision block 412, execution advances to block 416.

In an embodiment, at block 416, the control plane computer system deploys the job to the gateway computer system. In an embodiment, the job is deployed in the form of a job agent that runs within a runtime on the gateway computer system. In an embodiment, the job agent distributes a task to the master node of the cluster 418, and the master node of the cluster distributes the task to the slave nodes of the cluster via a network namespace that allows access to customer resources. In an embodiment, each slave node of the cluster runs the task after the task is received. In an embodiment, at block 420, the job agent running on the gateway computer system monitors the operation of the tasks. In an embodiment, the job agent assembles a job status based on the information received from the individual tasks running on the cluster and returns the job status to the control plane computer system.

Figure 5:
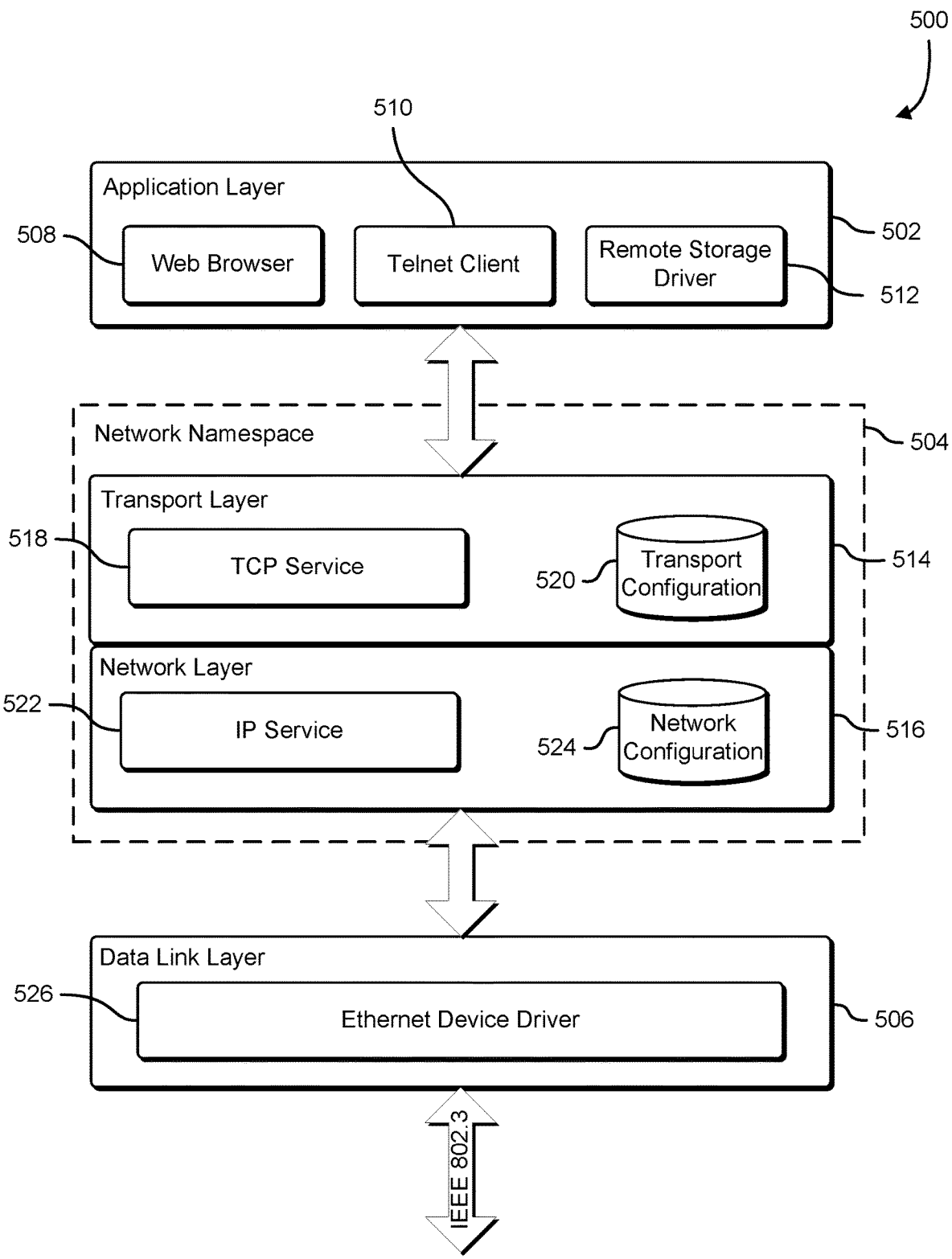
FIG. 5 shows an illustrative example of a network stack that implements a network namespace, in accordance with one embodiment.

FIG. 5 shows an illustrative example of a network stack that implements a network namespace, in accordance with one embodiment. A block diagram illustrates an embodiment of a network stack 500 that includes an application layer 502, a transport and network layer that implements a network namespace 504, and a data link layer 506. The application layer 502 is capable of hosting a variety of customer applications that may, in various embodiments, include a Web browser 508, a telnet client 510, or a remote storage driver 512. In an embodiment, applications within the application layer 502 may interact with the layers of the network namespace 504 using a socket application programming interface ("API"), a Winsock API, a stream interface, a messaging API, or an interprocess communication ("IPC") mechanism.

In an embodiment, the network namespace 504 includes a transport layer 514 and the network layer 516. In an embodiment, the network layers that implement the network namespace 504 contain state information that differentiates one network namespace from another. In an embodiment, each unique network namespace maintains a unique routing table that defines the subnets and network entities that are accessible via the namespace. In an embodiment, the transport layer 514 includes a TCP service 518 and a transport configuration data store 520. In an embodiment, the TCP service 518 is a computer-readable medium containing instructions that, when executed by a computer system hosting the network stack, implement transport-layer functionality of the computer network in accordance with the information stored in the transport configuration data store 520. In an embodiment, the transport configuration data store is a read/write memory device used by the TCP service 518 to store routing information. In an embodiment, the routing information comprises a routing table that includes a set of rules that define where data packets traveling over an Internet protocol ("IP") network are directed.

In an embodiment, the network layer 516 includes an IP service 522 and the network configuration data store 524. In an embodiment, the IP service 522 is a computer-readable medium containing instructions that, when executed by a computer system hosting the network stack, implement network-layer functionality of the network in accordance with information stored in the network configuration data store 524. The network configuration data store 524 is a read/write memory used by the IP service 522 to store network state information. In an embodiment, the network state information may include bridging and switching information such as address tables for switched segments of a physical network. In an embodiment, information that distinguishes the network namespace 504 from other network name spaces is contained in the transport configuration data store 520. In an embodiment, the transport configuration data store 520 comprises an IP routing table.

In an embodiment, the network stack includes a data link layer 506. In an embodiment, the data link layer 506 comprises an Ethernet device driver 526. In an embodiment, the data link layer 506 includes a physical network driver such as a token ring driver, a fiber net driver, a Wi-Fi network driver, or an electrical interface device to a physical network medium. In an embodiment, the data link layer 506 includes a virtual network driver that provides an interface to a virtual network such as an isolated virtual subnet.

Figure 6:
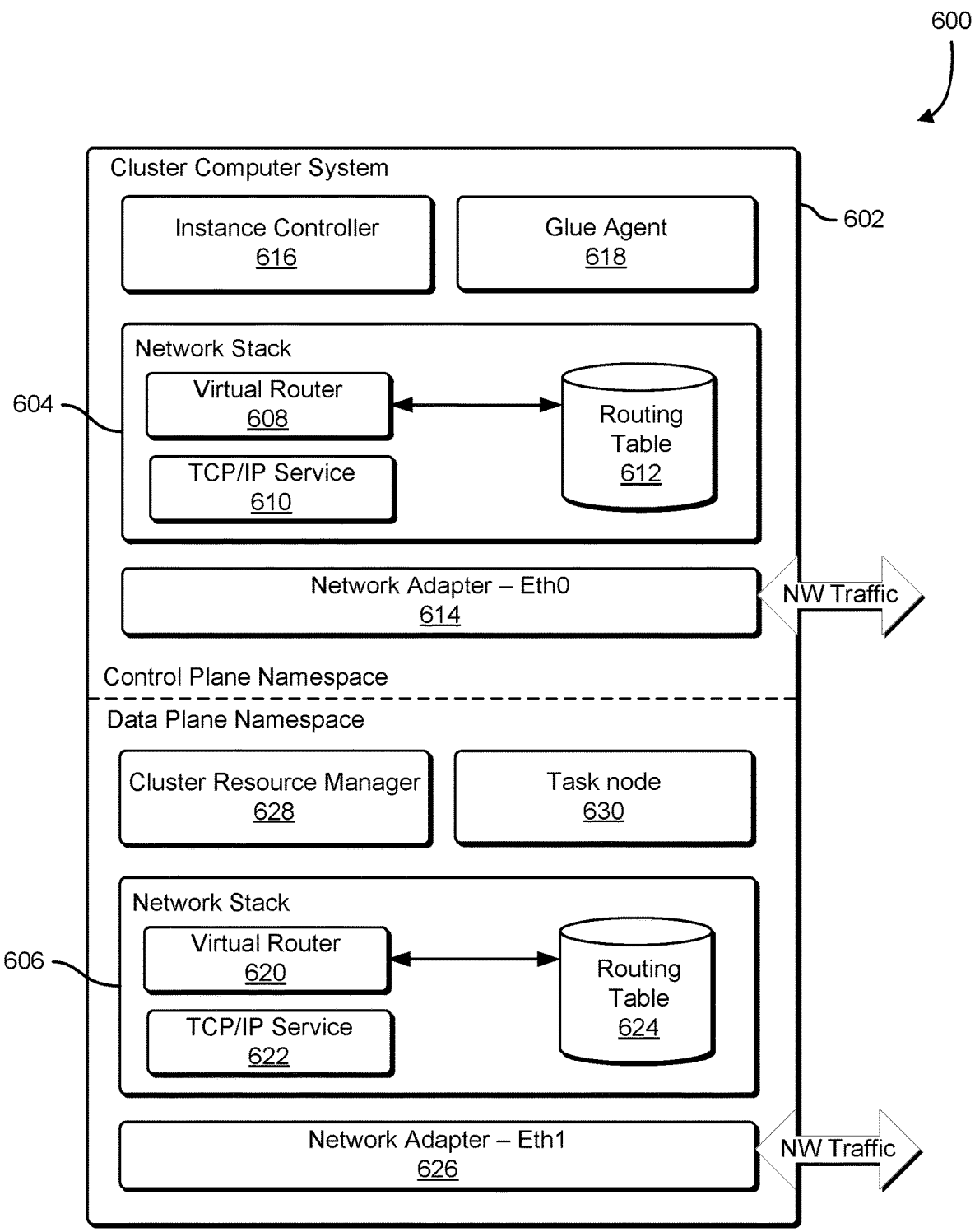
FIG. 6 shows an illustrative example of a cluster computer system that supports a control plane namespace and a data plane namespace, in accordance with one embodiment.

FIG. 6 shows an illustrative example of a cluster computer system that supports a control plane namespace and a data plane namespace, in accordance with one embodiment. A block diagram illustrates an embodiment 600 of a cluster computer system 602 that is a member of a computer cluster. In an embodiment, the cluster computer system 602 includes a first network stack 604 and a second network stack 606. In an embodiment, the first network stack 604 implements a control plane namespace. In an embodiment, the control plane namespace is implemented by the first network stack 604 using a virtual router 608 configured with a routing table 612 and a TCP/IP service 610. In an embodiment, the routing table 612 allows the first network stack 604 to communicate via a network adapter 614 with a control plane computer system operated by a computing resource service provider. In an embodiment, the control plane computer system allows the computing resource service provider to manage the creation, disassembly, and monitoring of the cluster computer system 602. In an embodiment, the network adapter 614 is a virtual network adapter connected to a virtual subnet.

In an embodiment, the control plane namespace of the cluster computer system 602 hosts an instance controller 616 and a glue agent 618. In an embodiment, the instance controller 616 communicates with a control plane computer system operated by the computing resource service provider. In an embodiment, the instance controller 616 is comprised of instructions stored in memory on the cluster computer system 602 that, when executed by a processor of the cluster computer system 602, communicate with the control plane computer system via the first network stack 604. In an embodiment, the instance controller 616 allows the control plane computer system to monitor the status of the cluster computer system 602. In an embodiment, the instance controller 616 allows the control plane computer system to control the operation of the cluster computer system 602.

In an embodiment, the glue agent 618 is comprised of executable instructions stored in memory of the cluster computer system 602 that, if executed by a processor on the cluster computer system 602, communicate with and perform operations at the direction of the control plane computer system. In an embodiment, the glue agent 618 is capable of transferring information between the control plane namespace of the cluster computer system 602 and the data plane namespace of the cluster computer system 602. In an embodiment, the glue agent 618 is used to transfer credentials supplied by the control plane computer system to an agent within the data plane namespace on the cluster computer system 602.

In an embodiment, the second network stack 606 includes a virtual router 620 and a TCP/IP service 622. In an embodiment, the virtual router 620 maintains a routing table 624 that allows the second network stack 606 to access a subnet that is not accessible via the control plane namespace. In an embodiment, the subnet that is not accessible to the control plane namespace is a customer subnet containing customer resources such as customer databases, services, or cryptographic services. In an embodiment, the second network stack 606 communicates with the subnet via a network adapter 626. In an embodiment, the network adapter 626 is a virtual network adapter connected to a virtual subnet of the customer. In an embodiment, a cluster resource manager 628 and a task node 630 connect to the customer network via the second network stack 606. In an embodiment, the cluster resource manager 628 is a service consisting of executable instructions stored in memory on the cluster computer system 602 that, when executed by a processor of the cluster computer system 602, manage one or more tasks associated with a parallel processing job submitted by the customer. In an embodiment, the task node 630 is a set of instructions associated with the customer job that is loaded onto the cluster computer system 602 and executed by a processor of the cluster computer system 602 to perform at least a portion of the job. In an embodiment, the task node 630 may be a Yarn datanode and the cluster computer system 602 may be a slave computer system in the computer system cluster. In an embodiment, the task node 630 may be a Yarn namenode and the cluster computer system 602 may be a master computer system of the computer system cluster.

Figure 7:
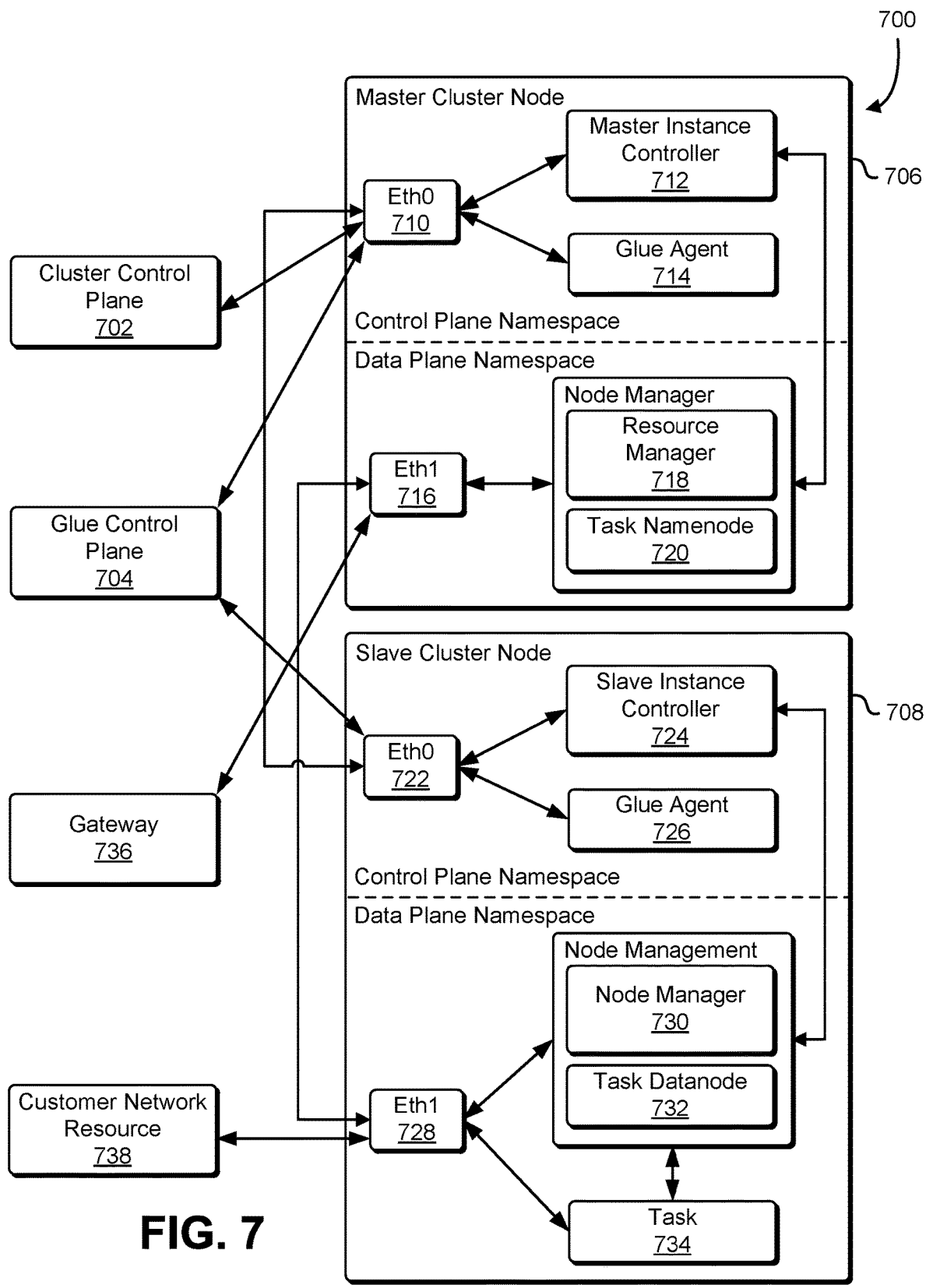
FIG. 7 shows an illustrative example of a cluster computer system that supports the processing of a parallel processing job, in accordance with one embodiment.

FIG. 7 shows an illustrative example of a system that supports processing of a parallel processing job, in accordance with one embodiment. A system diagram illustrates an embodiment of a cluster of computer systems 700 that are operated by a computer resource service provider to process parallel processing jobs submitted by a customer. In an embodiment, a cluster control plane 702 is a computer system operated by the computer resource service provider that is accessible via a control plane network namespace. In an embodiment, the cluster control plane 702 receives a job request from the customer, evaluates the job request, and determines a set of cluster parameters. In an embodiment, based at least in part on the set of cluster parameters, the cluster control plane 702 generates a computer cluster in accordance with the set of cluster parameters. In an embodiment, the cluster parameters may include a number of nodes in the cluster, an amount of memory for each system in the cluster, an amount of storage space allocated to each node in the cluster, and an amount of processing power allocated to each node in the cluster. In an embodiment, after generating the computer cluster, the cluster control plane 702 monitors the status of each cluster node to confirm proper operation.

In an embodiment, a glue control plane 704 communicates with each node of the generated cluster via a network accessible to the control plane namespace. In an embodiment, the glue control plane 704 is a computer system running a service that manages the distribution of information to tasks running on each slave node of the computer cluster. In an embodiment, the glue control plane acquires security tokens that are used by tasks running on the cluster and distributes the security tokens to each node via the control plane namespace. In an embodiment, agents running on the cluster relay the information from the control plane namespace to processes running within a data plane namespace.

In an embodiment, the cluster includes a master cluster node 706 and a slave cluster node 708. In an embodiment, the master cluster node implements a first network adapter 710 which is configured in accordance with the control plane namespace and is able to access the cluster control plane 702 and the glue control plane 704. In an embodiment, a master instance controller 712 and a glue agent 714 are services that run on the master cluster node 706 and communicate via the first network adapter 710. In an embodiment, the first network device is an Ethernet adapter configured on a UNIX system. In an embodiment, a second network adapter 716 implements a data plane namespace used by a resource manager 718 and a task namenode 720. In an embodiment, the master instance controller 712 communicates with the resource manager 718 to obtain the status of the slave cluster node 708. In an embodiment, the master instance controller 712 talks to the task namenode 720 to acquire the status of task datanodes running on associated slave cluster nodes. In an embodiment, the task namenode 720 is a Yarn namenode.

In an embodiment, the slave cluster node 708 includes a third network adapter 722 that supports access to the control plane namespace. In an embodiment, a slave instance controller 724 and a glue agent 726 are hosted by the slave cluster node 708 in the control plane namespace. In an embodiment, the slave cluster node 708 implements a fourth network adapter 728 that allows access to the data plane namespace. In an embodiment, a node manager 730, a task data node 732, and a task 734 use the fourth network adapter 728 to communicate with a customer subnet. In an embodiment, the task 734 uses the fourth network adapter 728 to communicate with a customer network resource 738. In an embodiment, the customer network resource 738 is a storage service, encryption service, Web service, or a processing service accessible to the data plane namespace. In an embodiment, a gateway computer system 736 uploads tasks to individual slave cluster nodes and monitors the operation of tasks on the cluster via the data plane namespace.

In an embodiment, the task 734 talks to the customer network resource 738 via the fourth network adapter 728. In an embodiment, the cluster control plane 702 requests the status of the nodes via the master instance controller 712. In an embodiment, the master instance controller 712 maintains health records indexed by the private DNS associated with the control plane namespace. In an embodiment, tasks running in the data plane namespace on slave nodes of the cluster computer system have private DNS addresses different from those addresses known to the cluster control plane 702 and the master instance controller 712. In an embodiment, the glue control plane 704 maintains a mapping between the DNS addresses for the tasks, and provides this mapping to the master instance controller 712. In an embodiment, the instance controller uses this information to translate data plane namespace addresses to control plane addresses before sending responses back to the cluster control plane 702.

In an embodiment, a customer submits a parallel processing job to the cluster control plane 702. In an embodiment, the cluster control plane 702 creates the master cluster node 706 and the slave cluster node 708 in accordance with a set of cluster parameters that are determined based at least in part on characteristics of the parallel processing job. In an embodiment, the master cluster node 706 and the slave cluster node 708 are virtual computer systems generated by the cluster control plane 702. In an embodiment, the glue control plane 704 maintains a mapping of addresses between the data plane namespace and the control plane namespace to facilitate communication of information between the two name spaces. In an embodiment, the glue control plane facilitates the transfer of credentials from the cluster control plane to the individual tasks on the slave cluster nodes via the glue agent 714 and the glue agent 726. In an embodiment, the gateway computer system 736 facilitates deployment and monitoring of the tasks on individual slave cluster nodes. In an embodiment, the customer network resource 738 is a resource used by the task 734.

Figure 8:
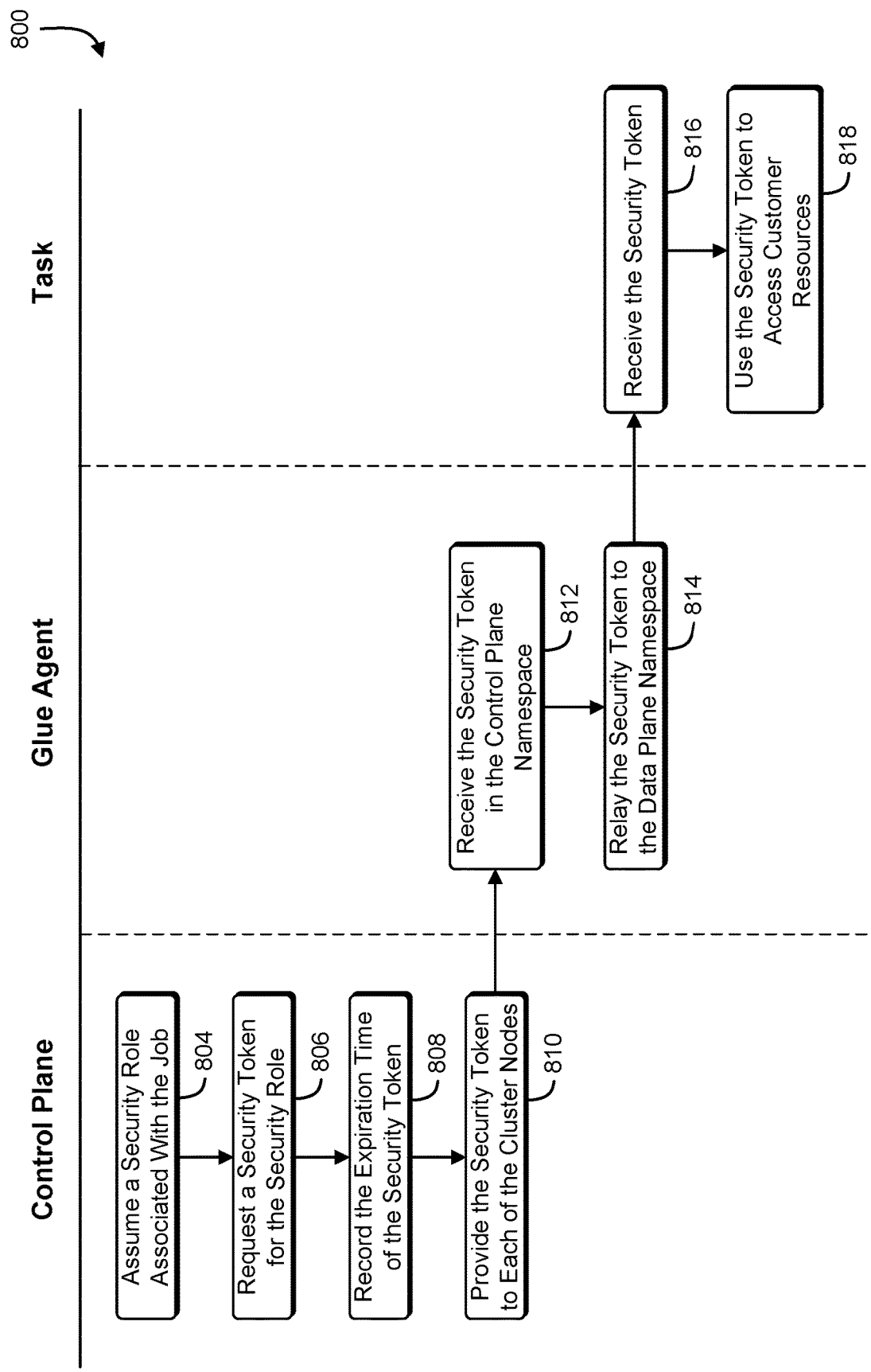
FIG. 8 shows an illustrative example of a process in accordance with one embodiment.

FIG. 8 shows an illustrative example of a process in accordance with one embodiment. A swim diagram 800 illustrates an embodiment of a process that, as a result of being performed by a control plane, a glue agent running in a control plane namespace and a cluster node, and a task running a data plane namespace on the cluster node, transfers security information to the task that allows the task to access customer resources in accordance with the security role provided to the control plane.

In an embodiment, the process begins at block 804 with the control plane assuming a security role associated with a job received from a customer. In an embodiment, the customer provides authorization to the control plane to assume the security role. In an embodiment, at block 806, the control plane computer system requests a security token for the security role. In an embodiment, the security token is requested from an authorization service run by a computing resource service provider. In an embodiment, the security token includes a cryptographically signed timestamp and an expiration time after which the security token will no longer be valid. In an embodiment, the security token is signed using a private key of a public-private key pair that is associated with a provider of a customer resource. In an embodiment, at block 808, the control plane computer system records the expiration time of the security token. In an embodiment, as the security token nears expiration, the control plane computer system requests a new security token with an updated expiration time, and the new security token is forwarded to the task prior to the expiration of the previous token.

In an embodiment, at block 810, the security token is sent to a glue agent running on a master node of a cluster computer system created by the control plane to process the job. In an embodiment, at block 812, the glue agent on the master node receives the security token from the control plane computer system. In an embodiment, at block 814, the glue agent relays the security token from the control plane namespace on the master node to a task control agent running in a data plane namespace on the master node.

In an embodiment, at block 816, the task running in the data plane namespace receives the security token from the glue agent. In an embodiment, at block 818, the task uses the security token to access a customer resource. In an embodiment, the customer resource can be a database, a storage device, a Web service, or other resource accessible via the data plane namespace.

Figure 9:
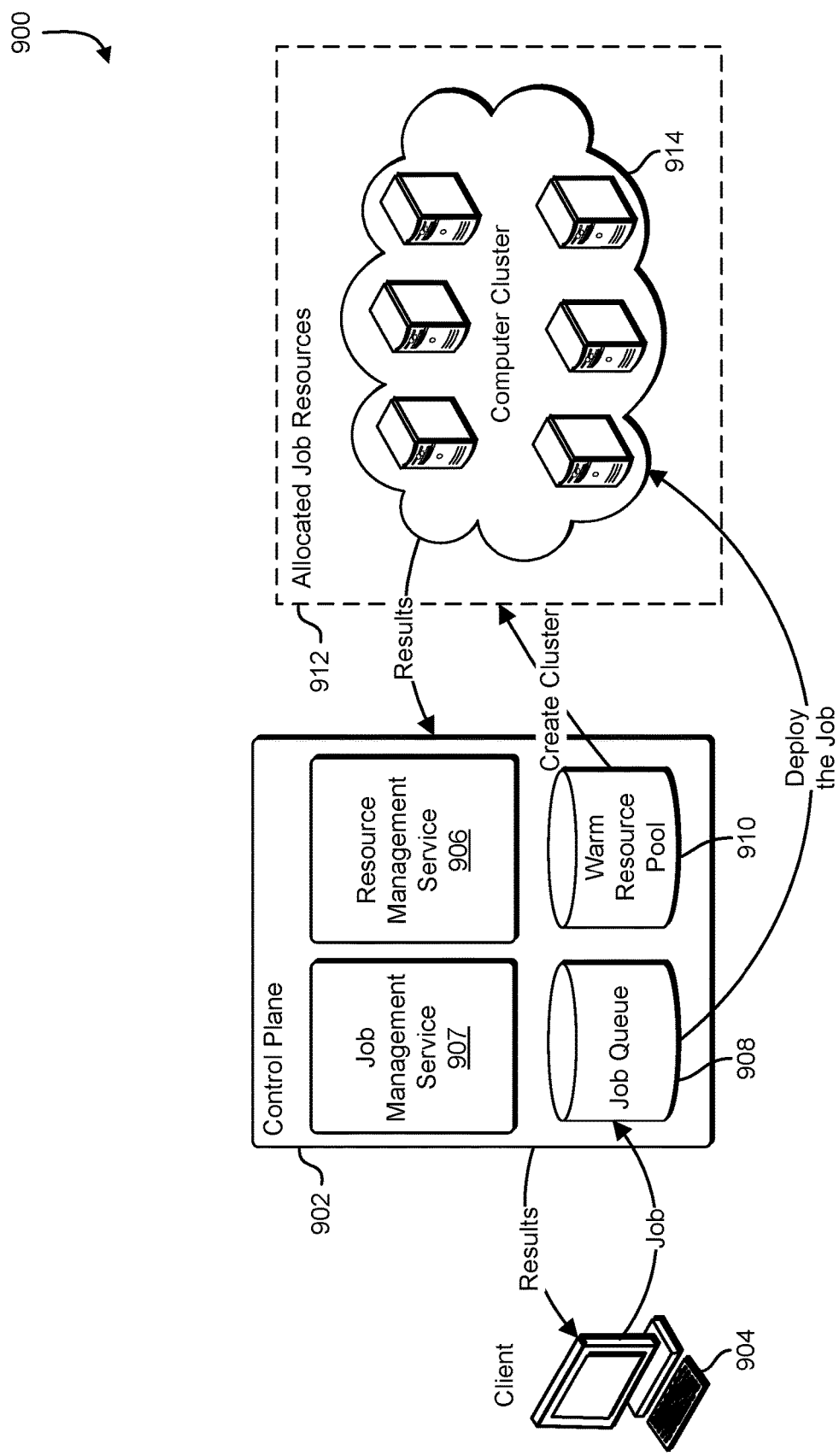
FIG. 9 shows an illustrative example of a control plane computer system that maintains a pool of resources for processing job requests, in accordance with one embodiment.

FIG. 9 shows an illustrative example of a control plane computer system that maintains a pool of resources for processing job requests, in accordance with one embodiment. A diagram illustrates an embodiment 900 of a control plane computer system 902 that processes jobs submitted by a client computer system 904. In an embodiment, the control plane computer system 902 hosts a resource management service 906 and a job management service 907. In an embodiment, the resource management service 906 and the job management service 907 are comprised of computer-readable instructions stored on a memory on the control plane computer system 902.

In an embodiment, if the computer-readable instructions of the resource management service 906 are executed by a processor on the control plane computer system 902, the control plane computer system 902 performs operations that manage a job queue 908. In an embodiment, the job queue 908 is a memory that stores information relating to incoming job requests in an embodiment, job requests may be retrieved from the job queue 908 in a first-in first-out order. In an embodiment, jobs may be stored in the job queue 908 with a scheduling tag that specifies a particular time. In an embodiment, the job queue 908 releases jobs after a time indicated by the scheduling tag. In an embodiment, if the computer-readable instructions of the job management service 907 are executed by a processor on the control plane computer system 902, the control plane computer system 902 performs operations that manage a warm resource pool 910. In an embodiment, the warm resource pool 910 maintains information associated with a set of computing resources that may be used to fulfill job requests. In an embodiment, the computing resources may include dedicated computer systems, server computer systems, storage resources, on-demand processing resources, virtual computer system instances, or runtime environments.

In an embodiment, the instructions associated with the resource management service 906 cause the control plane computer system 902 to generate and maintain a set of computing resources based on the state of the job queue 908. In an embodiment, the number of computing resources maintained for use in the warm resource pool 910 is a number of resources specified by the system administrator. In an embodiment, the number of computing resources maintained for use in the warm resource pool 910 is determined by the resource requirements of the jobs currently in the job queue 908. In an embodiment, the resource management service 906 searches the job queue 908 for upcoming jobs that are scheduled in the near future to estimate the amount of resources to be maintained in the warm resource pool 910. In an embodiment, the resource management service 906 maintains a historical record of jobs processed in the job queue 908, and identifies historical trends to predict future demand for computing resources. In an embodiment, the job management service 907 uses the predicted future demand to set the number of computing resources maintained in the warm resource pool 910.

In an embodiment, a customer submits a job request to the control plane computer system 902 via the client computer system 904. In an embodiment, the control plane computer system 902 receives the job request, determines a resource requirement for the received job, and stores the received job in the job queue 908 with the associated resource requirement. In an embodiment, the control plane computer system 902 periodically retrieves a job from the job queue 908 for processing. In an embodiment, the control plane computer system 902 allocates a set of resources 912 that are identified in the warm resource pool 910 for use in processing the job in accordance with the resource requirements of the job. In an embodiment, the set of resources 912 are removed from the warm resource pool 910 and are configured in accordance with the requirements of the job. In an embodiment, the set of resources 912 is configured into a computer cluster 914. After processing the job, the control plane computer system 902 may, in an embodiment, return the set of resources 912 to the warm resource pool 910.

Figure 10:
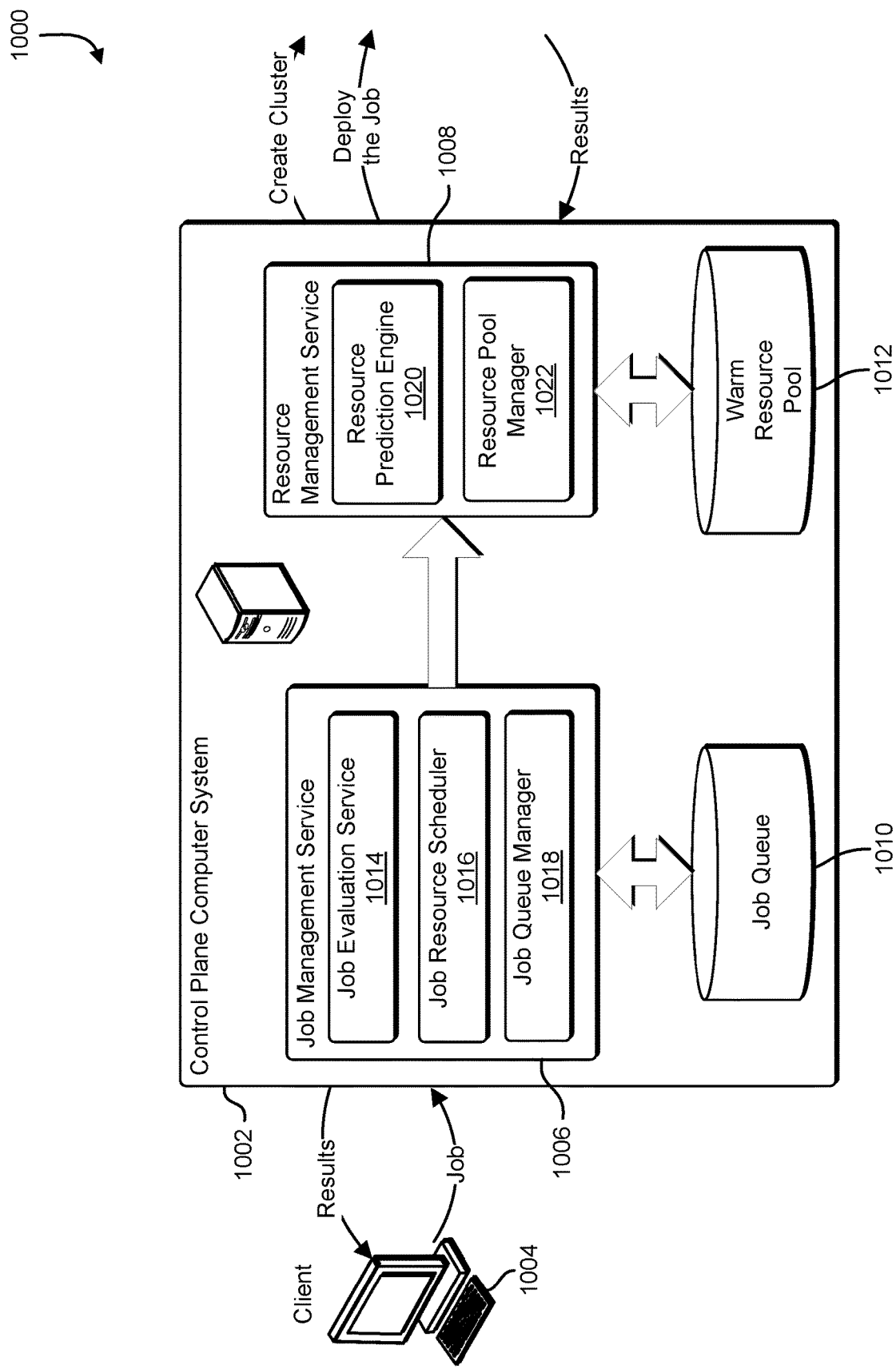
FIG. 10 shows an illustrative example of job management service and a resource management service running on a control plane computer system, in accordance with one embodiment.

FIG. 10 shows an illustrative example of job management service and a resource management service running on a control plane computer system, in accordance with one embodiment. A diagram illustrates an embodiment 1000 of a control plane computer system 1002. In an embodiment, the control plane computer system 1002 receives job requests from a client computer system 1004. In an embodiment, the control plane computer system 1002 is a computer system, server computer system, server cluster, virtual computer system, or computer runtime environment that hosts a job management service 1006 and a resource management service 1008. In an embodiment, the job management service 1006 and the resource management service 1008 are comprised of executable instructions stored on a memory of the control plane computer system 1002. In an embodiment, the executable instructions are executed by a processor of the control plane computer system 1002, causing the control plane computer system 1002 to manage the storage and retrieval of jobs to and from a job queue 1010, and the management of resources in a warm resource pool 1012.

In an embodiment, the job management service 1006 includes a job evaluation service 1014, a job resource scheduler 1016, and a job queue manager 1018. In an embodiment, each subcomponent of the job management service 1006 is implemented as an isolated set of instructions in memory, and provides functional interfaces that are accessible to other components of the control plane computer system 1002. In an embodiment, the job evaluation service 1014 receives jobs submitted by the client computer system 1004, and identifies resource requirements associated with each job. In an embodiment, the job evaluation service 1014 receives information with each job that describes the processing resources needed to process the job. In an embodiment, each job identifies a number of processing units needed to process the job. In an embodiment, the job evaluation service 1014 evaluates the substance of each job to infer an amount of computing resources needed to process the job. In an embodiment, after determining the resource requirements of the job, the control plane computer system 1002 stores the job description and the resource requirements for the job in the job queue 1010. In an embodiment, the job queue 1010 is a stack, queue, list, hash table, array, relational database, or data structure used to retain information relating to pending job requests. In an embodiment, jobs may be selected from the job queue 1010 for processing in a first-in first-out order, a first-in last-out order, a priority order, or according to a schedule specified by the administrator or by each job itself.

In an embodiment, the job queue manager 1018 stores received jobs in the job queue 1010 along with associated resource requirements, and identifies particular jobs to be processed. In an embodiment, the job queue manager 1018 maintains a set of queued jobs ready to be run, and scheduled jobs to be run at a future time. In an embodiment, the job queue manager 1018 extracts jobs from the job queue 1010 as resources become available and submits the jobs to the job resource scheduler 1016. In an embodiment, the job resource schedule 1016 acquires a set of resources for performing the job from the resource management service 1008, and then deploys the job to the acquired set of resources. In an embodiment, the set of resources is a set of virtual computer system instances created and/or managed by the resource management service 1008.

In an embodiment, the resource management service 1008 includes a resource prediction engine 1020 and resource pool manager 1022. In an embodiment, the resource prediction engine 1020 predicts the amount of resources that will be needed to perform upcoming jobs. In an embodiment, the resource prediction engine 1020 maintains an amount of resources in the warm resource pool 1012 that is configured by an administrator of the control plane computer system 1002. In an embodiment, the resource prediction engine 1020 examines the contents of the job queue 1010 to identify an amount of resources needed to process the currently pending jobs. In an embodiment, the resource prediction engine 1020 examines the historical contents of the job queue 1010 to predict future resource demands. In an embodiment, future resource demands may be predicted based on scheduled jobs that have not yet been executed in the job queue 1010 or periodic resource spikes present in the historical job queue information.

In an embodiment, the resource pool manager 1022 manages the contents of the warm resource pool 1012 in accordance with the predicted resource demands used by the resource prediction engine 1020. In an embodiment, the warm resource pool contains information that identifies computer systems, computer clusters, virtual computer systems, processing services, or other computer resources that can be used to fulfill job requests. In an embodiment, the resource pool manager 1022 determines the amount of resources currently in the warm resource pool 1012, and compares the current amount of resources to the amount of resources predicted by the resource prediction engine 1020. In an embodiment, if the warm resource pool 1012 does not contain sufficient resources, the resource pool manager 1022 creates or acquires additional resources which are then added to the warm resource pool 1012. In an embodiment, the warm resource pool 1012 includes references to virtual computer system instances, and the resource pool manager 1022 generates additional virtual computer system instances which are placed into the warm resource pool 1012.

In an embodiment, when a new job is received by the control plane computer system 1002, the job evaluation service 1014 determines the resource requirements for the new job and places the job in the job queue 1010. In an embodiment, the job queue manager 1018 extracts the new job from the job queue 1010 in accordance with any schedule and in coordination with any other jobs in the job queue 1010, and sends the job to job resource scheduler 1016 for execution. In an embodiment, the job resource schedule 1016 provides the resource requirements for the new job to the resource management service 1008, and the resource management service 1008 allocates the resources for the job from the warm resource pool 1012. In an embodiment, the resource management service 1008 configures the resources for use by the job, and the job resource scheduler 1016 performs the job using the provided resources. In an embodiment, when the job is complete, the results are relayed to the client computer system 1004 and the resources associated with the job are deallocated. In some embodiments, when the job is complete, the resources are not deallocated, but are instead cleaned of job-specific information and returned to the warm resource pool 1012.

Figure 11:
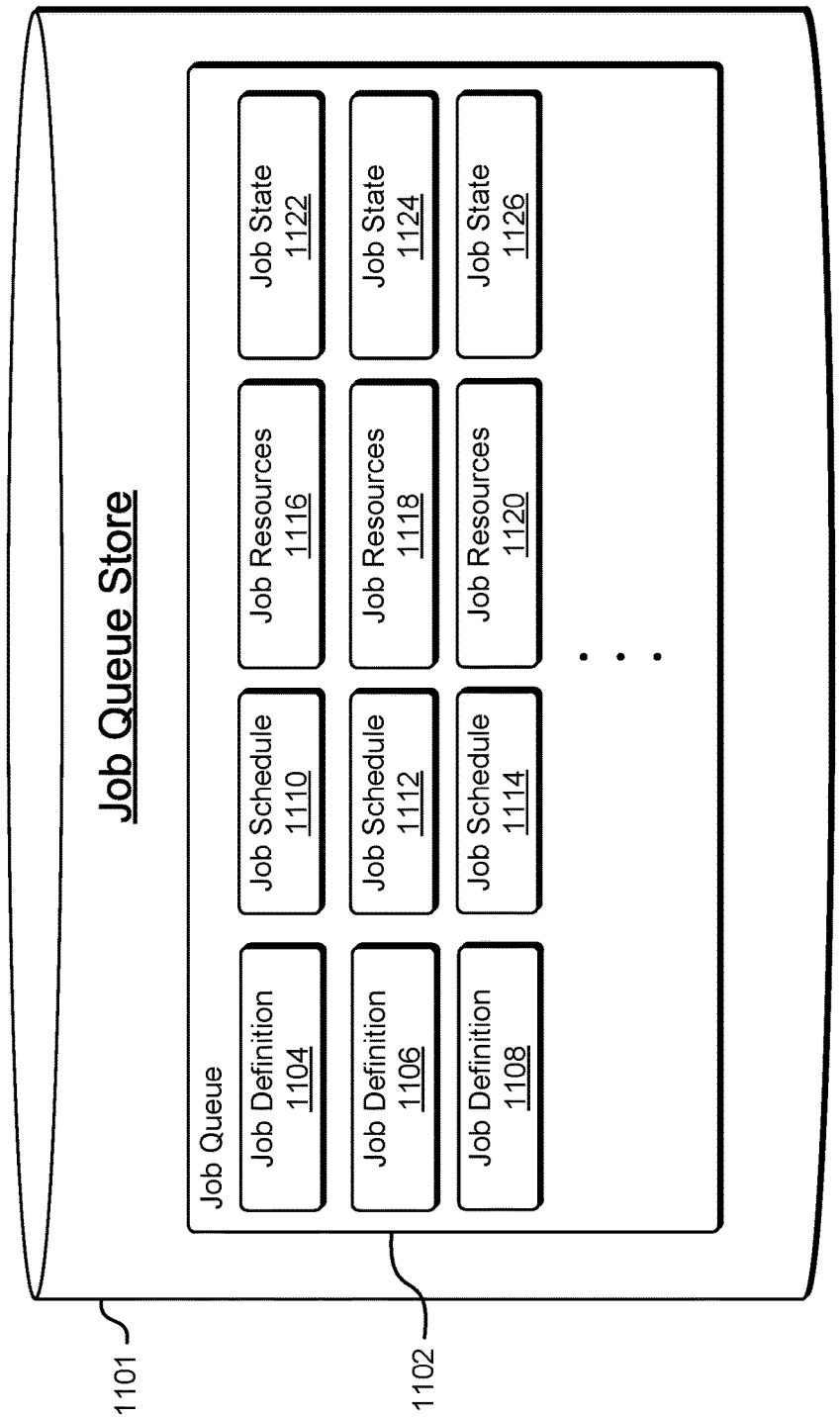
FIG. 11 shows an illustrative example of a job queue, in accordance with one embodiment.

FIG. 11 shows an illustrative example of a job queue, in accordance with one embodiment. A diagram illustrates an embodiment 1100 of a job queue store 1101 for storing a job queue 1102. In an embodiment, the job queue store 1101 may be a disk drive, memory device, storage service, or optical storage device connected to a control plane computer system. In an embodiment, the job queue 1102 may be implemented as a list, stack, queue, array, or other data structure for holding information related to incoming job requests. In an embodiment, the job queue 1102 retains the jobs in an order in which they were received. In an embodiment, the job queue 1102 establishes an ordering for the job records based on schedule information, priority information, or time of receipt for each job request.

In an embodiment, the job queue 1102 includes a collection of job records. In an embodiment, each individual record in the collection of job records includes a job definition 1104, 1106, and 1108, a job schedule 1110, 1112, and 1114, a field that identifies a set of job resources 1116, 1118, and 1120, and a job state 1122, 1124, and 1126. In an embodiment, the job definition fields contain information that describe the request to be performed by the control plane computer system. In an embodiment, the job definition may be represented as a set of executable commands, scripts, or executable instructions to be executed, or as a job ID that is associated with a set of executable commands, scripts, or executable instructions.

In an embodiment, the job schedule field of the job queue 1102 retains schedule information for an associated job. In an embodiment, the schedule information may identify a time in the future at which the job may be performed. In an embodiment, the schedule information may identify that the job be performed as soon as resources are available. In an embodiment, the schedule information may identify that the job may be performed periodically. In an embodiment, the job resources field identifies an amount of computing resources used to process the job. In an embodiment, the job resources field identifies a number of computing cores or data processing units ("DPU") used when performing the job. In an embodiment, the job resources field may identify an amount of memory or an amount of storage space needed to process the job.

In an embodiment, the job state field indicates the status of the associated job. In an embodiment, the job status for a job may be completed, running, pending, or scheduled. In an embodiment, job records for completed jobs are retained, and a time of execution for the completed job is recorded in the job queue store 1101. In an embodiment, completed job records may be used to predict future resource demands based on past periodic resource demands recorded in the job queue 1102.

Figure 12:
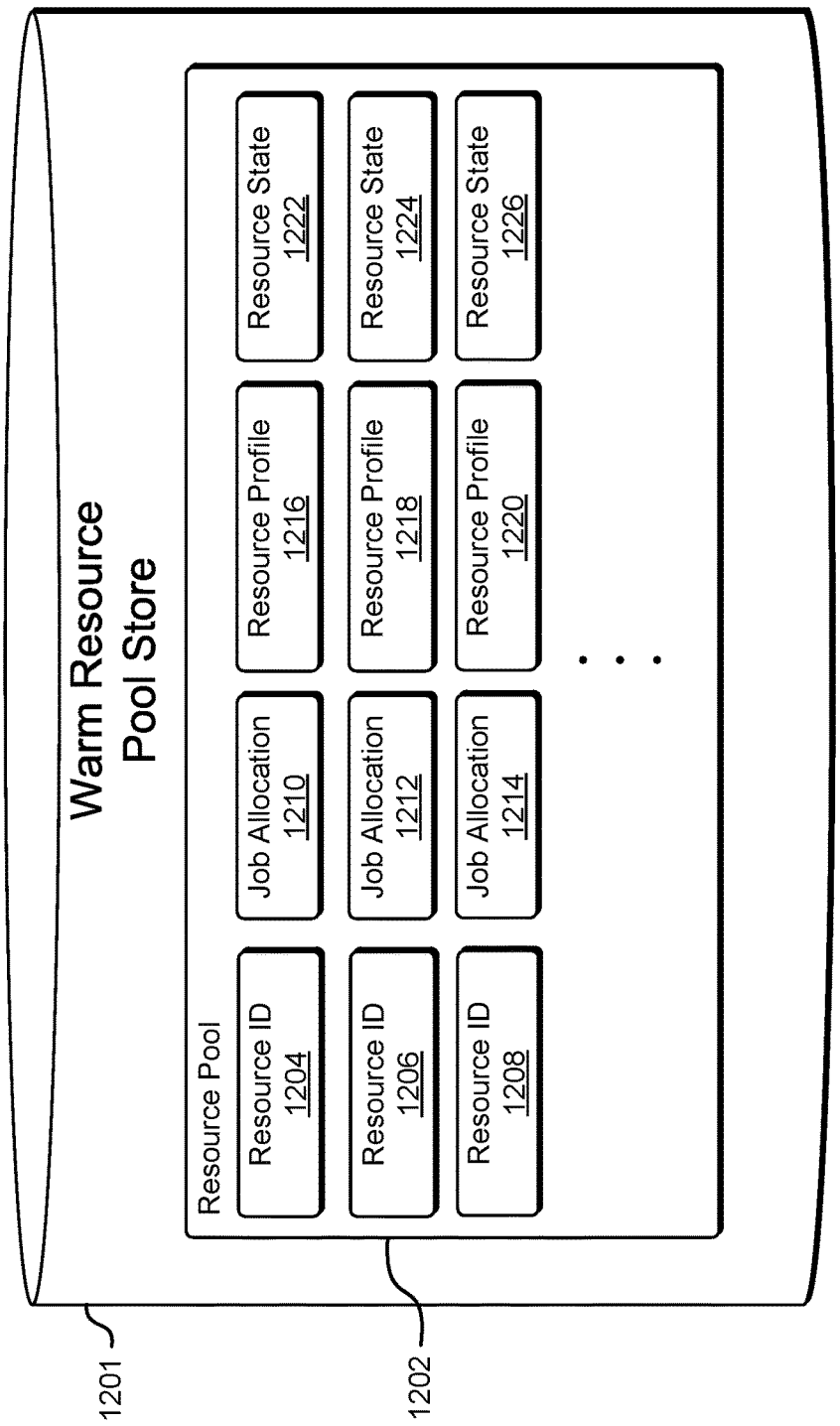
FIG. 12 shows an illustrative example of a resource pool data store, in accordance with one embodiment.

FIG. 12 shows an illustrative example of a resource pool data store, in accordance with one embodiment. A diagram illustrates an embodiment 1200 of a warm resource pool 1201 for storing a resource pool 1202. In an embodiment, the warm resource pool 1201 may be a disk drive, memory device, storage service, or optical storage device connected to a control plane computer system. In an embodiment, the resource pool 1202 may be implemented as a list, stack, queue, array, relational database, or other data structure for holding information related to available computing resources. In an embodiment, the resource pool 1202 retains a set of records that describe computing resources that are available for use in performing job requests. In an embodiment, the computing resources may include available computer systems, available server computer systems, available computing services, available virtual computer systems, available virtual computer system instances, or available processing services. In an embodiment, the computing resources may include data storage services, networking services, or cryptography services.

In an embodiment, the resource pool 1202 includes a collection of resource records. In an embodiment, each resource record includes a resource ID field 1204, 1206, and 1208, a job allocation field 1210, 1212, and 1214, a resource profile field 1216, 1218, and 1220, and a resource state field 1222, 1224, and 1226. In an embodiment, the resource ID field holds an identifier associated with a particular computing resource such as a computer name, a network address, hardware address, a processor ID, or a URL associated with the service. In an embodiment the job allocation field contains a reference to a job request in a job queue or job store to which the associated resource is dedicated. In an embodiment, the resource profile field contains information that describes the associated resource. In an embodiment, the associated resource may be a processing resource and the resource profile may include an amount of processor bandwidth, a number of DPUs, or a number of operations per second. In an embodiment, the associated resource may be a storage resource and the resource profile may include a number of bytes or a storage quota. In an embodiment, the associated resource may be a network resource and the resource profile may be a bandwidth or transfer limit. In an embodiment the resource state field records the availability state of the associated resource. In an embodiment, the availability state of the associated resource indicates whether the associated resource is available, currently processing a job request, unavailable, or awaiting deallocation. In an embodiment, the associated resource is a virtual computer system instance and the resource date indicates whether the virtual computer system instance is active, suspended, or hibernated.

In an embodiment, a control plane computer system determines that resources should be added to the resource pool 1202. In an embodiment, the control plane computer system acquires the resources from available sources or alternatively creates new resources as needed. In an embodiment, for each new resource, the control plane computer system generates a new record in the resource pool 1202. In an embodiment, the control plane computer system generates a resource ID and a resource profile for the new resource, and writes the resource ID and the resource profile to the resource pool 1202. In an embodiment, the job allocation for the new resource is cleared, and the resource date for the new resource indicates that the new resource is available for use.

In an embodiment, when a job request is to be processed, the control plane computer system identifies one or more resources from the resource pool 1202. In an embodiment, the job allocation fields of the identified resources are set to the identifier of the job request, and the resource state fields of the identified resources are set to indicate that the resources are in use. In an embodiment, the control plane computer system configures the identified resources to perform the job, and returns the results to the requester when the job is complete. In an embodiment, the identified resources may be deleted and the resource state of the identified resources set to unavailable and the job allocation fields of the identified resources cleared. In an embodiment, the identified resources may be returned to the resource pool after job-specific information is removed from the resources, the job allocation fields of the identified resources are cleared, and the resource state fields of the identified resources are set to indicate that the identified resources are available.

Figure 13:
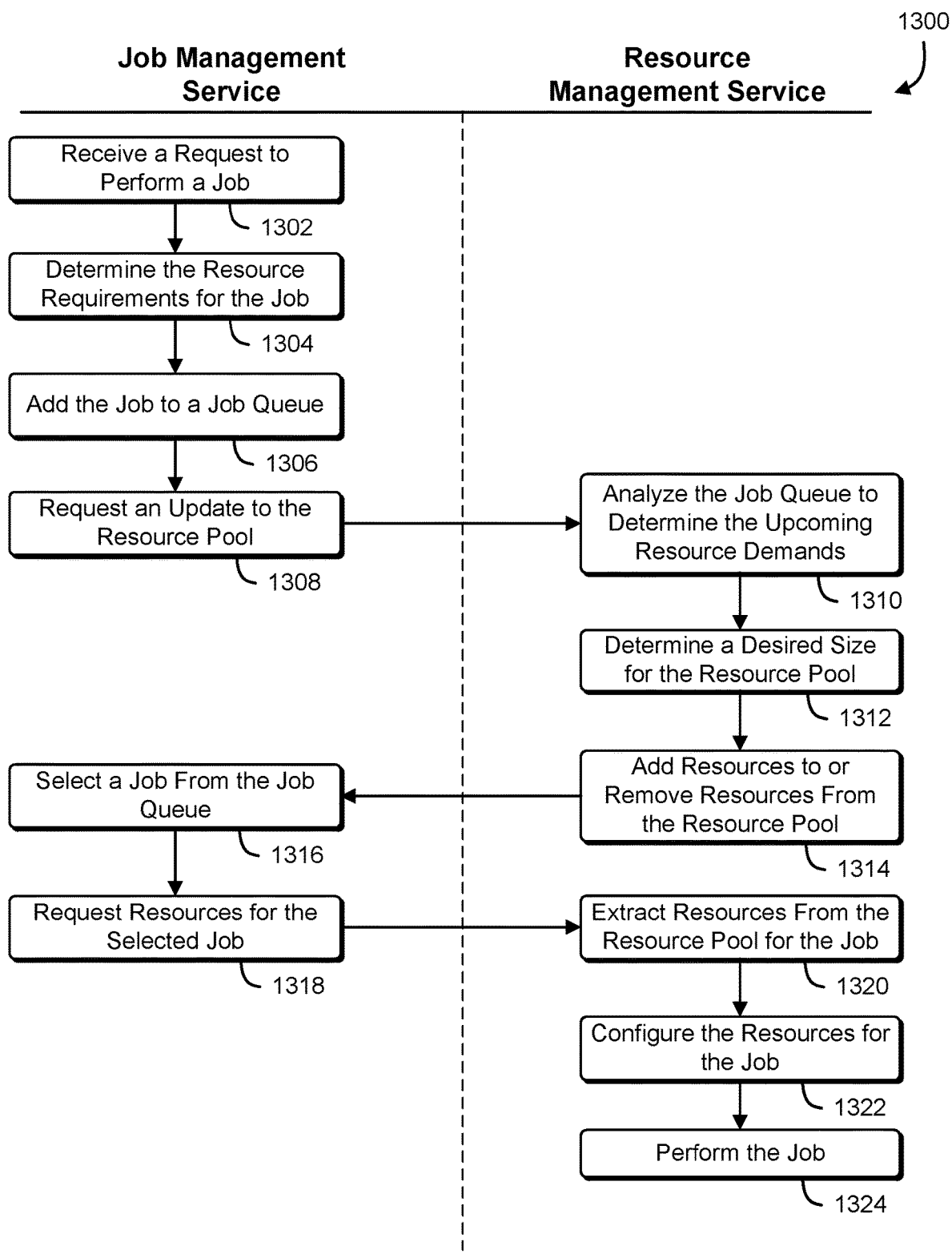
FIG. 13 shows an illustrative example of a process in accordance with one embodiment.

FIG. 13 shows an illustrative example of a process in accordance with one embodiment. In an embodiment, a swim diagram illustrates an example of process 1300 that, if performed by a job management service and a resource management service hosted on a control plane computer system, performs a job request using resources from a warm resource pool. In an embodiment, the process begins at block 1302 with a job management service receiving a request for a job. In an embodiment, the job is a mapreduce job, an extraction transform and load ("ETL") job, or parallel processing job requiring a plurality of computing resources to be performed. In an embodiment, the request is received from a client computer system operated by a customer.

In an embodiment, at block 1304, the job management service determines a set of resource requirements for the received job. In an embodiment, the job management service determines a number of data processing units, an amount of memory, an amount of storage, or an amount of network bandwidth required to process the job. In an embodiment, the resource requirements include a number of data processing units, and a resource profile for each data processing unit. In an embodiment, at block 1306, the job management service stores an entry in a job queue for the received job. In an embodiment, the entry includes a job identifier, the resource requirements for the job, and any scheduling information for the job. In an embodiment, the scheduling information may include a time at which the job is to be executed or a priority of the job with respect to other jobs in the job queue. In some an embodiment, jobs are selected for processing in the order in which they are received by the job management service. In an embodiment, at block 1308, after adding the job to the job queue, the job management service requests that the resource management service update a resource pool. In an embodiment, the resource pool is a database describing resources that are ready and available for use in processing job requests.

In an embodiment, at block 1310, the resource management service receives the request to update the resource pool and analyzes the job queue to determine upcoming resource demands. In an embodiment, the resource management service determines upcoming resource demands by determining the resource requirements of each job in the job queue that is scheduled to be performed within a threshold amount of time. In an embodiment, at block 1312, the resource management service determines a desired amount of resources to be maintained in the resource pool based on the determined upcoming resource demands. In an embodiment, the desired amount of resources is a number of data processing units, a number of virtual machines, or an amount of processing capacity. In an embodiment, at block 1314, the resource management service adjusts the amount of resources and the resource pool in accordance with the desired amount of resources. In an embodiment, the resource management service assigns computer systems, virtual computer system instances, or other processing resources to the resource pool to meet or exceed the desired amount of resources.

In an embodiment, at block 1316, the job management service selects a job from the job queue for processing. In an embodiment, at block 1318, the job management service identifies an amount of resources sufficient to process the request and requests the amount of resources from the resource management service.

In an embodiment, at block 1320, the resource management service receives the request for resources and selects a set of resources from the resource pool that satisfies the request for resources. In an embodiment, the resource management service removes the resources from the pool of available resources, and configures 1322 to the resources in accordance with the requirements of the selected job. In an embodiment, at block 1324, the resource management service uses the configured resources to perform the job request.

Figure 14:
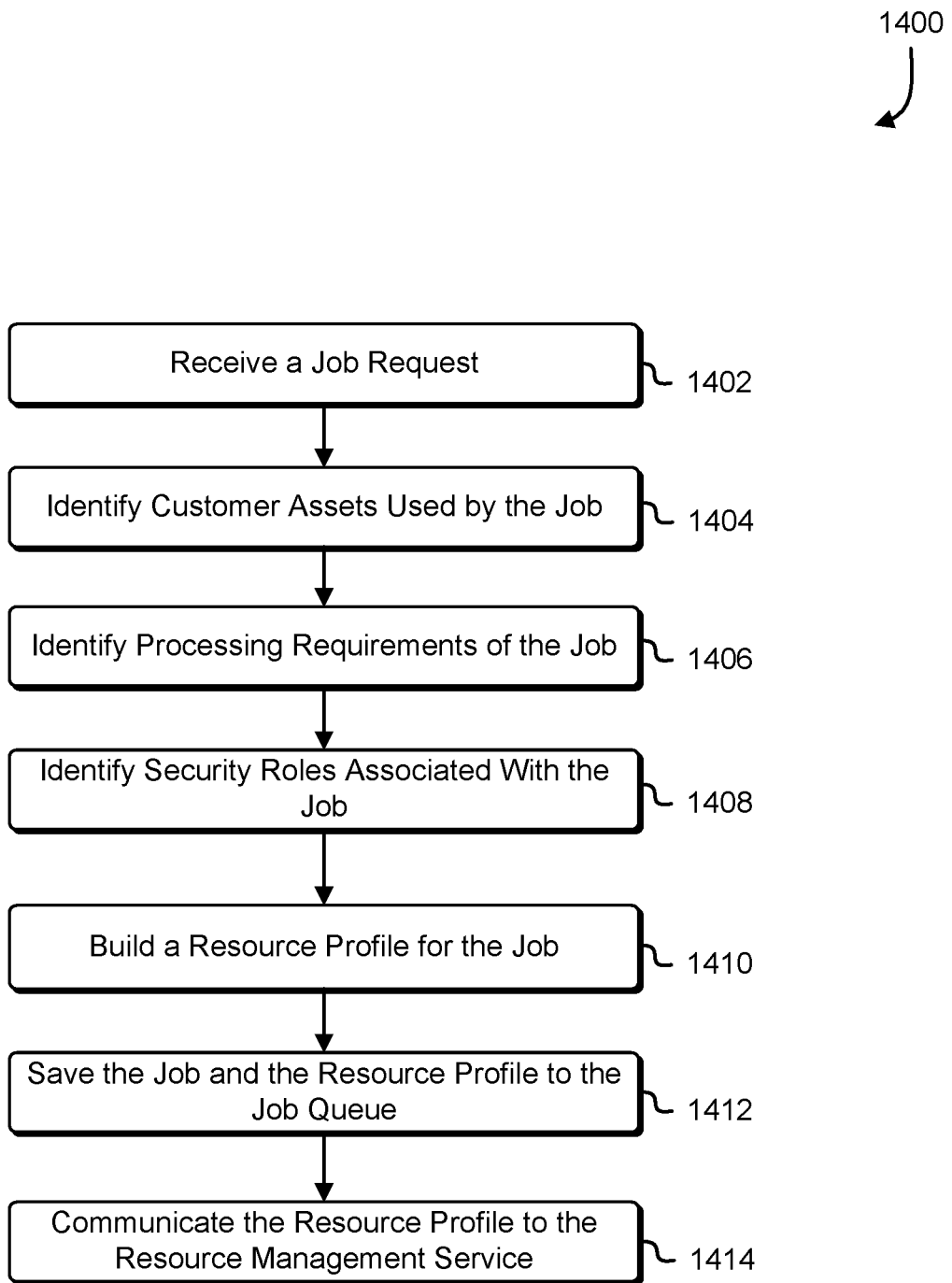
FIG. 14 shows an illustrative example of a process in accordance with one embodiment.

FIG. 14 shows an illustrative example of a process in accordance with one embodiment. A flowchart illustrates an embodiment of a process 1400 that, if executed by a control plane computer system, determines an amount of resources used to process a job request. In an embodiment, the process begins at block 1402 with a control plane computer system receiving, from a customer, a request to perform a job such as an ATL job, a mapreduce job, or parallel processing job. In an embodiment, at block 1404, the control plane computer system identifies any customer assets used by the job such as storage resources, or other resources that are accessible on a network subnet controlled by the customer. In an embodiment, at block 1406, the control plane computer system identifies processing requirements of the job such as a number of data processing units, a number of processing cores, an amount of cache memory, an amount of network bandwidth, or virtual machine profile information. In an embodiment, at block 1408, the control plane computer system identifies any security roles that are necessary to process the job. In an embodiment, the security roles may be a security role associated with the customer that submitted the job request. In an embodiment, the control plane computer system may acquire a security token using credentials provided with the job request, and store the security token with the job request. In an embodiment, the security token may be used by the computing resources that process the job to access one or more customer resources on a customer network.

In an embodiment, at block 1410, the control plane computer system builds a resource profile for the job. In an embodiment, the resource profile is comprised of information that identifies the customer assets used by the job, any security roles or security tokens used to access the customer assets, and the computing resources and processing requirements needed to process the job. In an embodiment, the resource profile includes a security token, a number of DPUs, and information that identifies one or more network name spaces that may be used to access customer resources. In an embodiment, at block 1412, the control plane computer system saves the resource profile in a job queue in association with a job ID, and a job definition. In an embodiment, the job definition may be a script file, executable instructions, or an identifier that identifies a script file or executable instructions that, when executed, perform the job request.

In an embodiment, at block 1414, the control plane computer system provides the resource profile to a resource management service. In an embodiment, the resource profile may be provided to the resource management service by providing the resource management service with access to the job queue. In an embodiment, the resource management service uses the provided information to predict a level of resources that will be sufficient to perform future requests.

Figure 15:
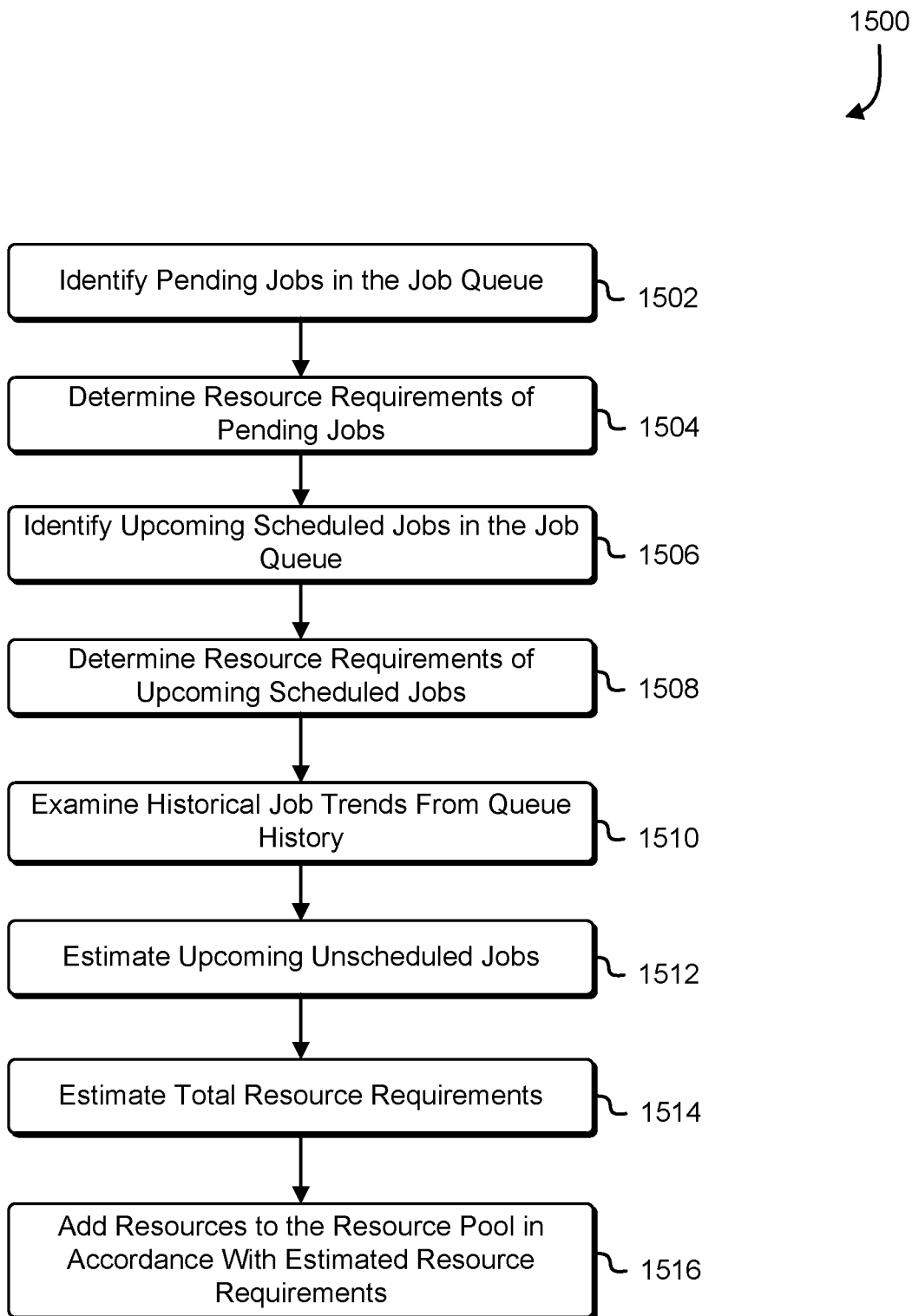
FIG. 15 shows an illustrative example of a process in accordance with one embodiment.

FIG. 15 shows an illustrative example of a process in accordance with one embodiment. A flowchart illustrates an embodiment of a process 1500 that, if executed by a control plane computer system, adjusts the amount of resources in a warm pool for use in processing job requests. In an embodiment, the process begins at block 1502 with a control plane computer system examining a job queue to identify a set of pending jobs. In an embodiment, a pending job is a job in the queue that is ready to be processed. In an embodiment, the set of pending jobs excludes those jobs that are in the queue, but scheduled to be released at a time in the future. In an embodiment, at block 1504, the control plane computer system determines the resource requirements for the set of pending jobs. In an embodiment, the resource requirements may include a total number of data processing units, or total number of virtual machine instances needed to process the set of pending jobs.

In an embodiment, at block 1506, the control plane computer system identifies jobs that are scheduled for upcoming scheduled jobs, where the upcoming scheduled jobs are defined as jobs that are scheduled to be performed in a threshold amount of time in the future. In an embodiment, the threshold amount of time is set by an administrator. In an embodiment, the threshold amount of time is based on the interval over which new jobs are extracted from the job queue and processed by the control plane computer system. In an embodiment, at block 1508, the control plane computer system determines a set of resource requirements for the jobs that are scheduled in the near future. In an embodiment, the set of resource requirements may include a total number of data processing units, or a total number of virtual machine instances sufficient to process the upcoming jobs.

In an embodiment, at block 1510, the control plane computer system examines historical job records. In an embodiment, the historical job records are maintained in the job queue after the jobs are completed. In an embodiment, the control plane computer system identifies periodic trends in resource demand based on the historical job records. In an embodiment, periodic trends may be identified as trends that occur on an hourly, daily, weekly, or monthly basis. In an embodiment, for example, the control plane computer system may examine past historical records in the job queue to determine that a spike in demand for computing resources occurs at a particular time each day. In an embodiment, at block 1512, if the control plane computer system predicts a spike in demand for computing resources is imminent, an amount of computing resources sufficient to meet the spike in demand is estimated.

In an embodiment, at block 1514, the control plane computer system estimates the total resource demand by adding the resource requirements for pending jobs, the resource requirements for scheduled jobs, and the resource requirements for predicted unscheduled jobs as determined at blocks 1504, 1508, and 1512. In an embodiment, at block 1516, the control plane computer system examines the resource pool, and adds computing resources to the resource pool so that the total number of resources and the resource pool is sufficient to meet the resource demand predicted in block 1514. In an embodiment, the control plane computer system generates virtual computer system instances, and adds the generated virtual computer system instances to the resource pool such that the number of computing resources and the resource pool meets or exceeds the total number of data processing units predicted at block 1514.

Figure 16:
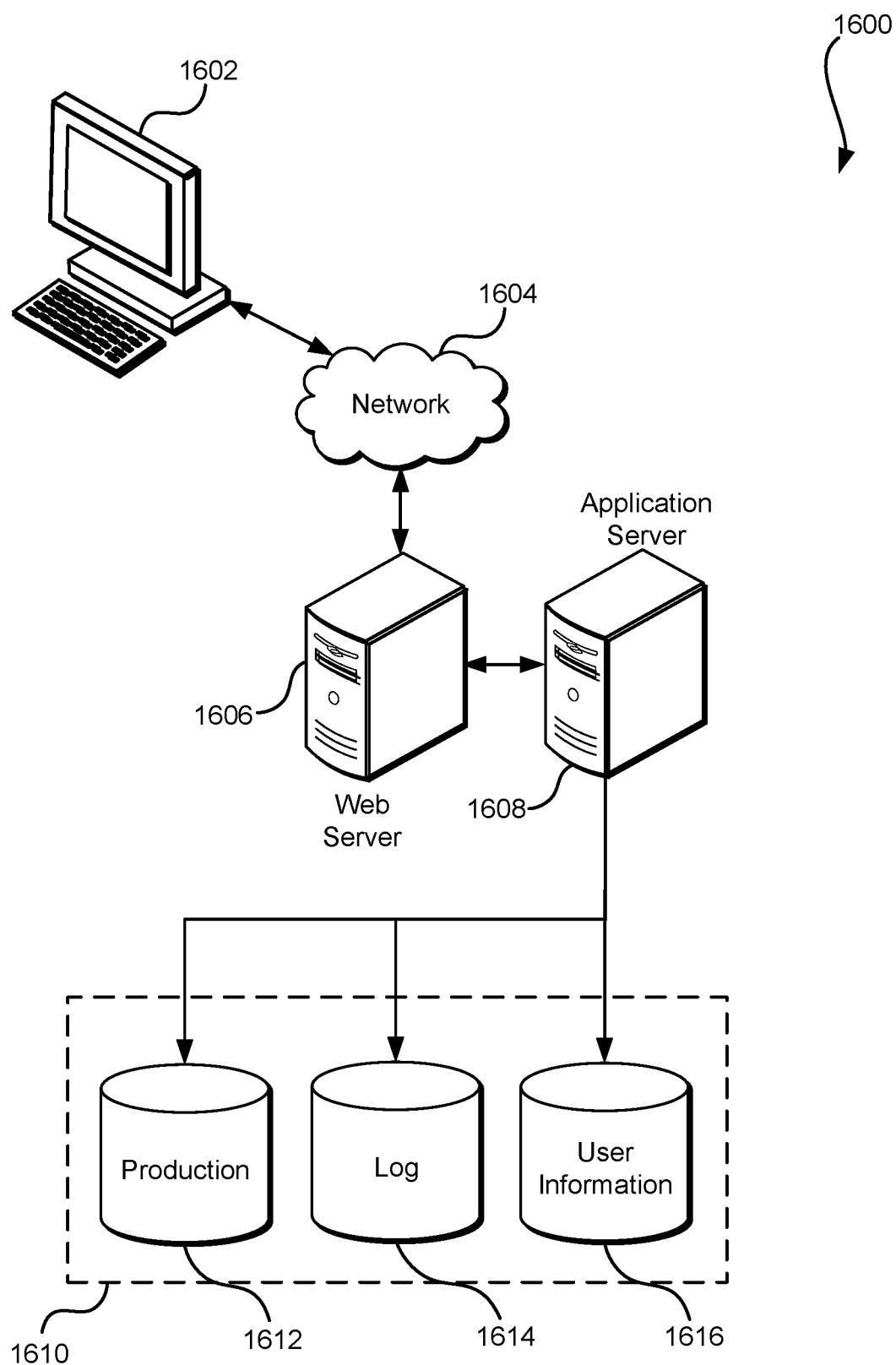
FIG. 16 shows an illustrative example of a system in which various embodiments can be implemented.

FIG. 16 illustrates a system 1600 for implementing aspects in accordance with one embodiment. In an embodiment, a Web-based system is used. The system includes an electronic client device 1602, which can include any appropriate device operable to send and/or receive requests, messages, or information over an appropriate network 1604 and, in an embodiment, convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof. In an embodiment, components used for such a system can depend at least in part on the type of network and/or system selected. In an embodiment, communication over the network can be enabled by wired or wireless connections and combinations thereof. In an embodiment, the network includes the Internet and/or publicly addressable communications network, as the system includes a Web server 1606 for receiving requests and serving content in response thereto. In an embodiment, an alternative device serving a similar purpose is used for other networks.

In an embodiment, the illustrative system includes at least one application server 1608 and a data store 1610. In an embodiment, there are several application servers, layers, or other elements, processes, or components, which are chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In an embodiment, the application server can include any appropriate hardware, software, and firmware that integrates with the data store as needed to execute aspects of one or more applications for the client device, handling some or all of the data access and business logic for an application. In an embodiment, the application server provides access control services in cooperation with the data store and is able to generate content including, but not limited to, text, graphics, audio, video, and/or other content usable to be provided to the user, which may be served to the user by the Web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device is processed by the client device to provide the content in one or more forms including, but not limited to, forms that are perceptible to the user audibly, visually, and/or through other senses. In an embodiment, the handling of requests and responses, and the delivery of content between the client device 1602 and the application server 1608, is handled by the Web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In an embodiment, the data store 1610 includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1612 and user information 1616, which can be used to serve content for the production side. In an embodiment, the data store is shown to include a mechanism for storing log data 1614, which can be used for reporting, analysis, or other such purposes. In an embodiment, other aspects are stored in the data store, such as page image information and access rights information, which can be stored in any of the above listed mechanisms as appropriate or in additional mechanisms in the data store 1610. In an embodiment, the data store 1610 is operable, through logic associated therewith, to receive instructions from the application server 1608 and obtain, update, or otherwise process data in response thereto. In an embodiment, the application server 1608 provides static, dynamic, or a combination of static and dynamic data in response to the received instructions. In an embodiment, dynamic data, such as data used in Web logs (blogs), shopping applications, news services, and other such applications is generated by server-side structured languages as described herein or may be provided by a content management system ("CMS") operating on, or under the control of, the application server. In an embodiment, a user, through a device operated by the user, submits a search request for a certain type of item, and the data store accesses the user information to verify the identity of the user and can access the catalog detail information to obtain information about items of that type, and then the information is returned to the user. In an embodiment, the information is returned as a results listing on a web page that the user is able to view via a browser on the client device 1602. In an embodiment, information for a particular item of interest is viewed in a dedicated page or window of the browser. The present disclosure is not limited to the context of web pages, and may be applicable to processing requests in general where the requests are not requests for content.

In an embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. In an embodiment, such a system could have a fewer or a greater number of components than are illustrated in FIG. 16. Thus, the depiction of the system 1600 in FIG. 16 should be taken as being illustrative in nature and not limiting to the scope of the disclosure.

An embodiment can be implemented in a wide variety of systems, which in some cases can include one or more user computers, computing devices, or processing devices, which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual computer system, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In an embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In an embodiment, the protocol is a reliable connection-oriented protocol such as TCP. In an embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In an embodiment that utilizes a Web server, the Web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the server (s) are capable of executing programs or scripts in response to requests from user devices, such as by executing one or more Web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In an embodiment, the server(s) include one or more database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In an embodiment, these reside in a variety of locations, such as on a storage medium local to (and/or resident in) one or more of the computers or remote from any or all of the computers across the network. In an embodiment, the information may reside in a storage-area network ("SAN") familiar to those skilled in the art. In an embodiment, files for performing the functions attributed to the computers, servers, or other network devices may be stored locally and/or remotely, as appropriate. In an embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices include a number of software applications, modules, services, or other elements located within at least one working memory device, including an operating system and application programs, such as a client application or Web browser. In an embodiment, customized hardware is used and/or particular elements are implemented in hardware, software (including portable software, such as applets), or both. In an embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device.

In an embodiment, a service may be implemented using a serverless computing architecture. In an embodiment, a serverless computing service is a service that allows users to submit requests for program execution to the service without being assigned a particular computing resource. In an embodiment, requests for execution on a serverless computing service are stateless from the standpoint of the service, and any program state is passed in with the request. In an embodiment, the host entity for the serverless computing service designates physical computing resources on demand, and may one or more computer systems as needed based on transient demand. In an embodiment, serverless computing services improve the scalability of the system by allowing requests to be fulfilled using a variety of physical processing resources under the control of the serverless computing service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    receiving, from a Web-based service, a request to perform one or more operations on a set of data on a data source at a scheduled time
    determining an amount of computing resources to fulfill the request;
    as a result of determining that the scheduled time is within a threshold amount of a current time, add a total amount of computing resources to a resource pool that includes the amount of computing resources to fulfil the request;
    processing the request by at least:
        executing code specific to the request using computing resources from the resource pool to generate transformed data; and
    storing the transformed data at a destination.

2. The computer-implemented method of claim 1,
wherein the total amount of computing resources is determined at least in part by:
    identifying a set of scheduled requests to be processed within a threshold amount of time;
    determining an amount of computer systems to perform the set of scheduled requests; and
    adding the determined amount of computer systems to the resource pool.

3. The computer-implemented method of claim 1, further comprising:
    predicting future demand for computer systems based at least in part on a historical record of processed requests; and
    adding an amount of computer systems to the resource pool in accordance with the predicted future demand.

4. The computer-implemented method of claim 1, wherein determining the total amount of computing resources is accomplished at least in part by adding individual resource requirements that are associated with pending requests.

5. A system, comprising:
    one or more processors; and
    memory storing instructions that, if executed on the one or more processors, cause the system to:
        enable a first quantity of computing resources to process a first one or more requests received by a Web-based service indicating a first one or more data sources and a first one or more operations to be performed by the first quantity of computing resources on data from the first one or more data sources;
        receive one or more additional requests indicating a second one or more data sources and a second one or more operations to be performed, at a scheduled time, by the Web-based service on data from the second one or more data sources;
        determine an additional quantity of computing resources to process the one or more additional requests;

as a result of determining that the scheduled time is within a threshold amount of a current time, add the additional quantity of computing resources to a resource pool that includes the first quantity of computing resources; and fulfill the first and additional one or more requests by at least using computing resources in the resource pool to perform the first and second operations on data from the first and second one or more data sources.

6. The system of claim 5, wherein:
the first quantity of computing resources is comprised of one or more virtual computer systems; and
the additional quantity of computing resources is a set of virtual computer systems instantiated by the system.

7. The system of claim 5, wherein:
the first one or more data sources is located on a network subnet; and
the instructions, if executed on the one or more processors, further cause the system to configure the first quantity of computing resources such that the first quantity of computing resources is able to access the network subnet.

8. The system of claim 5, wherein estimating an additional quantity of computing resources is accomplished at least in part by:
identifying a set of scheduled requests to be processed within a threshold amount of time;
determining an amount of computing resources to perform the set of scheduled requests; and
adding the determined amount of computing resources to the additional quantity of computing resources.

9. The system of claim 5, wherein estimating an additional quantity of computing resources is accomplished at least in part by:
predicting future demand for computing resources based at least in part on a historical record of processed requests; and
adding an amount of computing resources to the additional quantity of computing resources in accordance with the predicted future demand.

10. The system of claim 5, wherein:
the first one or more requests includes an associated first resource requirement;
the one or more additional requests includes an associated additional resource requirement; and
estimating the additional quantity of computing resources is accomplished at least in part by adding the first resource requirement and the additional resource requirement.

11. The system of claim 10, wherein:
the first one or more requests and the one or more additional requests are stored in a queue; and
each individual request in the queue is stored with an associated resource requirement.

12. The system of claim 5, wherein the first one or more requests include a MapReduce job or an extraction transformation and loading ("ETL") job.

13. A non-transitory computer-readable storage medium including stored thereon executable instructions that, as a result of being executed by one or more processors of a computer system, cause the computer system to at least:
enable a first quantity of computing resources to process a first one or more requests received by a Web-based service indicating a first one or more data sources and a first one or more operations to be performed by the first quantity of computing resources on data from the first one or more data sources;
receive one or more additional requests indicating a second one or more data sources and a second one or more operations to be performed, at a scheduled time, by the Web-based service on data from the second one or more data sources;
determine an additional quantity of computing resources to process the one or more additional requests;
as a result of determining that the scheduled time is within a threshold amount of a current time, add the additional quantity of computing resources to a resource pool that includes the first quantity of computing resources; and
fulfill the first and additional one or more requests by at least using computing resource in the resource pool to perform the first and second operations on data from the first and second one or more data sources.

14. The non-transitory computer-readable storage medium of claim 13, wherein:
the first quantity of computing resources is comprised of one or more virtual computer systems; and
the additional quantity of computing resources is a set of virtual computer systems instantiated by the system.

15. The non-transitory computer-readable storage medium of claim 13, wherein:
the first one or more data sources is located on a network subnet; and
the instructions, if executed on the one or more processors, further cause the system to configure the first quantity of computing resources such that the first quantity of computing resources is able to access the network subnet.

16. The non-transitory computer-readable storage medium of claim 13, wherein estimating an additional quantity of computing resources is accomplished at least in part by:
identifying a set of queued requests to be processed;
determining a first amount of computing resources to perform the set of queued requests; and
adding the first amount of computing resources to the additional quantity of computing resources.

17. The non-transitory computer-readable storage medium of claim 16, wherein estimating an additional quantity of computing resources is accomplished at least in part by:
predicting future demand for computing resources based at least in part on a historical record of processed requests; and
adding a second amount of computing resources to the additional quantity of computing resources in accordance with the predicted future demand.

18. The non-transitory computer-readable storage medium of claim 13, wherein:
the first one or more requests includes an associated first resource requirement;
the one or more additional requests includes an associated additional resource requirement; and
estimating an additional quantity of computing resources is accomplished at least in part by adding the first resource requirement and the additional resource requirement.

19. The non-transitory computer-readable storage medium of claim 18, wherein:
the first one or more requests and the one or more additional requests are stored in a queue; and
each individual request in the queue is stored with an associated resource requirement.

20. The non-transitory computer-readable storage medium of claim 13, wherein the first one or more requests include a MapReduce job or an extraction transformation and loading ("ETL") job.

\* \* \* \* \*